US011888850B2

(12) United States Patent
Jain et al.

(10) Patent No.: US 11,888,850 B2
(45) Date of Patent: Jan. 30, 2024

(54) PROXIMITY-BASED UNLOCKING OF COMMUNAL COMPUTING DEVICES

(71) Applicant: Microsoft Technology Licensing, LLC, Redmond, WA (US)

(72) Inventors: Raju Jain, Kirkland, WA (US); Dipesh Bhattarai, Redmond, WA (US); Peter Gregory Davis, Redmond, WA (US); Jeffrey Johnson, Bellevue, WA (US); Liang Zhang, Redmond, WA (US); Kiran Kumar, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/808,172

(22) Filed: Jun. 22, 2022

(65) Prior Publication Data
US 2022/0321561 A1 Oct. 6, 2022

Related U.S. Application Data

(62) Division of application No. 16/156,496, filed on Oct. 10, 2018, now Pat. No. 11,399,024.

(51) Int. Cl.
*H04L 9/40* (2022.01)
*H04W 12/63* (2021.01)

(52) U.S. Cl.
CPC ...... *H04L 63/0884* (2013.01); *H04L 63/0853* (2013.01); *H04L 63/0861* (2013.01); *H04L 63/102* (2013.01); *H04W 12/63* (2021.01)

(58) Field of Classification Search
CPC ............. H04L 63/0853; H04L 63/0861; H04L 63/0884; H04L 63/102; H04L 63/105; H04L 63/107; H04L 9/3215; H04L 9/3231; H04L 9/3234; H04L 65/4015; G06F 21/32; G06F 21/34; G06F 21/604; G06F 2221/2111; G06F 2221/2113; H04W 12/065; H04W 12/082; H04W 12/63
See application file for complete search history.

(56) References Cited

U.S. PATENT DOCUMENTS

| | | | | |
|---|---|---|---|---|
| 8,218,829 | B2 * | 7/2012 | Kenoyer | G06F 21/32 382/106 |
| 8,577,810 | B1 * | 11/2013 | Dalit | G06Q 20/20 705/16 |
| 9,292,840 | B1 * | 3/2016 | Velline | G06Q 20/1085 |
| 10,325,087 | B1 * | 6/2019 | Goodsitt | G06F 21/36 |
| 2010/0107219 | A1 | 4/2010 | Thompson et al. | |
| 2017/0195339 | A1 * | 7/2017 | Brown | H04W 4/80 |
| 2019/0222570 | A1 * | 7/2019 | Krishan | H04W 12/068 |
| 2020/0267144 | A1 * | 8/2020 | Wagner | G06Q 20/1085 |
| 2021/0027295 | A1 * | 1/2021 | Raquepaw | G07F 19/206 |

FOREIGN PATENT DOCUMENTS

| | | |
|---|---|---|
| CN | 102035835 A | 4/2011 |
| CN | 107431924 A | 12/2017 |
| KR | 101719687 B1 | 4/2017 |
| WO | 2005029890 A1 | 3/2005 |
| WO | 2018007060 A1 | 1/2018 |

OTHER PUBLICATIONS

"Notice of Allowance Issued In European Patent application No. 19784167.9", dated Mar. 3, 2023, 7 Pages.
"Notice of Allowance Issued In European Patent application No. 19784195.0", dated Mar. 13, 2023, 7 Pages.
"Office Action Issued in Indian Patent Application No. 202147016231", dated Nov. 24, 2022, 7 Pages.
"Office Action Issued in Indian Patent Application No. 202147016641", dated Dec. 9, 2022, 9 Pages.
"Notice of Allowance Issued in European Patent Application No. 19784195.0", dated Jun. 2, 2023, 2 Pages.
"Notice of Allowance Issued in European Patent Application No. 19784167.9", dated Jun. 2, 2023 2 Pages.
"First Office Action and Search Report Issued in Chinese Patent Application No. 201980066681.2", dated Oct. 13, 2023, 16 Pages.
"Office Action Issued in Indian Patent Application No. 202147016230", dated Sep. 4, 2023, 7 Pages.
"First Office Action and Search Report Issued in Chinese Patent Application No. 201980066525.6", dated Oct. 12, 2023, 18 Pages.

* cited by examiner

*Primary Examiner* — Minh Dinh

(57) ABSTRACT

A communal computing device, such as an interactive digital whiteboard, can become unlocked if a user is near the device. The communal computing device may use a sensor such as a camera to capture images of a person and obtain an identifier from a personal device such as a smartphone. A cloud-based provider that is trusted by both the communal computing device and the personal device may associate both the image and the identifier of the personal device with the same user identity. Obtaining the user identity from multiple, different sources provides a secure technique for the communal computing device to recognize a user without the user directly interacting with the communal computing device. If the sensor no longer detects the user or the personal device is no longer detected, then the communal computing device may log off the user. The personal device may be used to confirm log off.

15 Claims, 15 Drawing Sheets

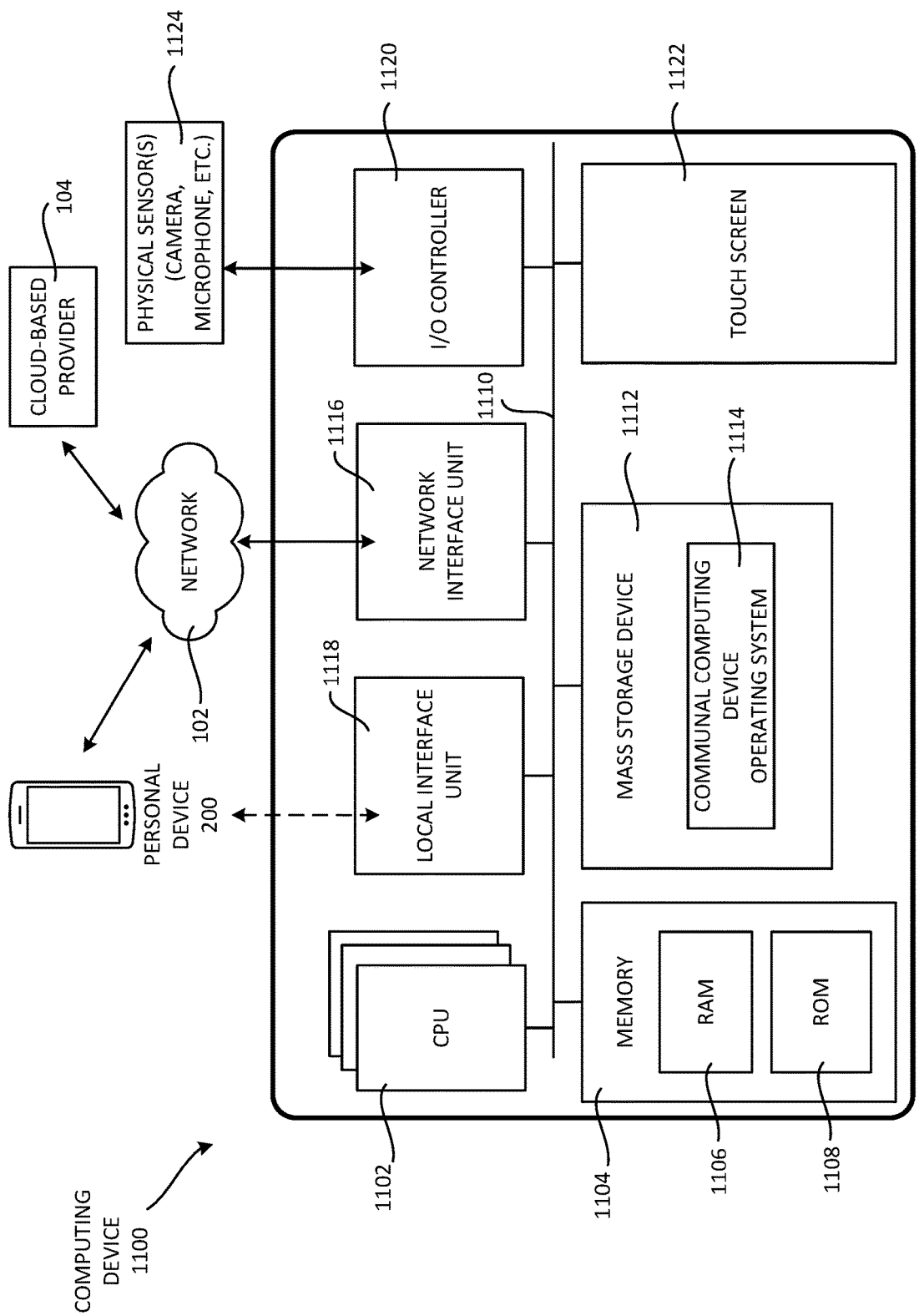

PROXIMITY-BASED UNLOCKING OF COMMUNAL COMPUTING DEVICES

CROSS-REFERENCE TO RELATED APPLICATIONS

This application is a divisional of U.S. patent application Ser. No. 16/156,496 filed Oct. 10, 2018, entitled "Proximity-based unlocking of communal computing devices," which is incorporated herein by reference in its entirety.

BACKGROUND

User authentication on devices that are shared with many others (communal computing devices), like an interactive digital whiteboard, a smart television, or a public kiosk, presents a complex set of user concerns. These types of devices are used by multiple users and each user may wish to access personalized content and his or her own files. Logging in using a password is one way for a user to be recognized by a device and gain access to personal documents and other content.

However, passwords can be insecure and can be cumbersome for users to enter on communal computing devices without a physical keyboard. It might also be insecure and awkward for users to enter passwords when in front of other users, such as on a large-screen communal device or a communal computing device in a public location. Typing in a password on a communal computing device may present a security risk which could be mitigated by another technique for the device to recognize a user.

Biometric security, such as face recognition, can provide a more secure and convenient way to authenticate users on communal computing devices. Biometric security, however, typically requires specialized hardware and per-device enrollment (e.g. fingerprint, face, or voice enrollment). Per-device enrollment may be impractical when the user wishes to use a communal computing device quickly and may not use that device again. Due to security concerns, biometric data is typically stored on the device where the biometrics are captured rather than on a remote location accessed via a network such as cloud storage. However, due to the shared nature of communal computing devices, there are also security concerns related to storing biometric data on a communal computing device.

Consequently, current log-in or authentication techniques when used on communal computing devices are either insecure or require additional processor usage and specialized hardware to enroll biometric data. It is with respect to these and other technical challenges that the disclosure made herein is presented.

SUMMARY

A trust relationship is established between a communal computing device, such as an interactive digital whiteboard, and a trusted cloud-based provider such as a centrally-managed identity service. The cloud-based provider is implemented by a collection of networks, networking devices, protocols, etc. that enable computing devices to access services provided by network-accessible computing systems from any location that has access to the networks. A trust relationship is also established between a user's personal device, such as a smartphone, and the cloud-based provider. For instance, in an enterprise environment, a user's personal device may be registered on the same corporate network as the communal computing device in order to establish the trusted relationship.

By leveraging the user's existing personal device as a tool for authenticating on a communal computing device, security is improved relative to existing techniques and processor usage for implementing log in and biometric enrollment is reduced. The personal device can serve as a second factor for authentication in addition to user interactions with the communal computing device. Any interactions that may raise security concerns if performed in front of a group on a communal computing device can instead be performed privately on the user's personal device. If biometrics are used, the enrollment may be done once on the personal device, saved locally on the personal device, but used to unlock additional functionally and data on any communal computing device that operates according to the technology described in this disclosure.

As part of the personal device registration process, a user might be asked to provide "low-fidelity" identification data, such as a self-snapshot or a recording of the user speaking. The low-fidelity identification data may be stored by the cloud-based provider. The low-fidelity identification data may also be stored on the user's personal device. Other types of non-personal information can also be stored, such as a hardware identifier (ID) for the user's personal device. There are no security concerns for storing low-fidelity identification data because this type of data does not impact user privacy and by itself cannot be used to access private data or secure information.

When the user later comes into proximity to the communal computing device, the communal computing device can use the low-fidelity identification data to recognize the user. For example, a camera on the communal computing device might capture an image of the user or a microphone might capture audio of the user speaking. Additionally, the communal computing device might detect the hardware ID for the user's personal device via short-range wireless communication using radio waves such as the BLUETOOTH communications protocol or other protocol. The communal computing device can then communicate with the cloud-based provider to determine if a match is found with the user's previously-stored identification data (e.g. the previously stored self-snapshot or device hardware ID). In an implementation, the communal computing device can compare identification data captured by one of its sensors such as a camera with identification data provided by the personal device such as a self-snapshot obtained over a BLUETOOTH connection.

If a match is found, the communal computing device can recognize the user such as by "logging in" the user. For example, the communal computing device might recognize people in its proximity by use of the camera and provide each recognized user with access to his or her data and functionality on the communal computing device. Recognized users may be indicated on a user interface (UI) of the communal computing device such as by showing a username or icon representing each user. To improve the speed of identification and to reduce the possibility of an incorrect match, the matching may be performed against a limited set of the identities known to the cloud-based provider. Use of a limited search scope to identify a user is discussed in U.S. patent application entitled "Authenticating Users Of Communal Computing Devices Using A Limited Search Scope" filed on the same day as this application.

The communal computing device may be unlocked if a recognized user is in its proximity. In an implementation, unlocking the communal computing device may include an authentication step. Authentication may be performed without the user directly making any input on the communal computing device. The communal computing device can send a request for second-factor authentication to the cloud-based provider. In turn, the cloud-based provider can send a request for second-factor authentication to the user's personal device. If the user is able to authenticate on the personal device (e.g. provide a personal identification number (PIN), password, fingerprint, etc.), then the cloud-based provider informs the communal computing device indicating that the user has been authenticated. In some implementations, authentication may be part of unlocking the community computing device and in other implementations, authentication may provide a different level of access to functionality and data than merely logging in or unlocking. Thus, the logging in or recognition of the user may serve as a first factor for authentication and the input provided on the personal device serves as the second factor for authentication.

Once the user is finished using the communal computing device, the user can be "logged out" of the communal computing device when the user's presence is no longer detected in proximity to the communal computing device. For example, once a hardware ID is no longer detected by the communal computing device or a video camera on the communal computing device no longer detects the user, the user may be automatically signed out. Automatic sign out based on lack of proximity to the communal computing device further enhances security and user convenience. Once signed out, the user's data can be removed from the communal computing device and any settings associated with the user may be returned to default values. In this way, a user can leave the area of the communal computing device with confidence that his or her user information will not be exposed to others and the communal computing device is ready for the next user.

It should be appreciated that the above-described subject matter can be implemented as a computer-controlled apparatus, a computer-implemented method, a computing device, or as an article of manufacture such as a computer-readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

FIG. 11 is a computer architecture diagram and network diagram showing an illustrative computer hardware and software architecture for the communal computing device.

DETAILED DESCRIPTION

Figure 1:
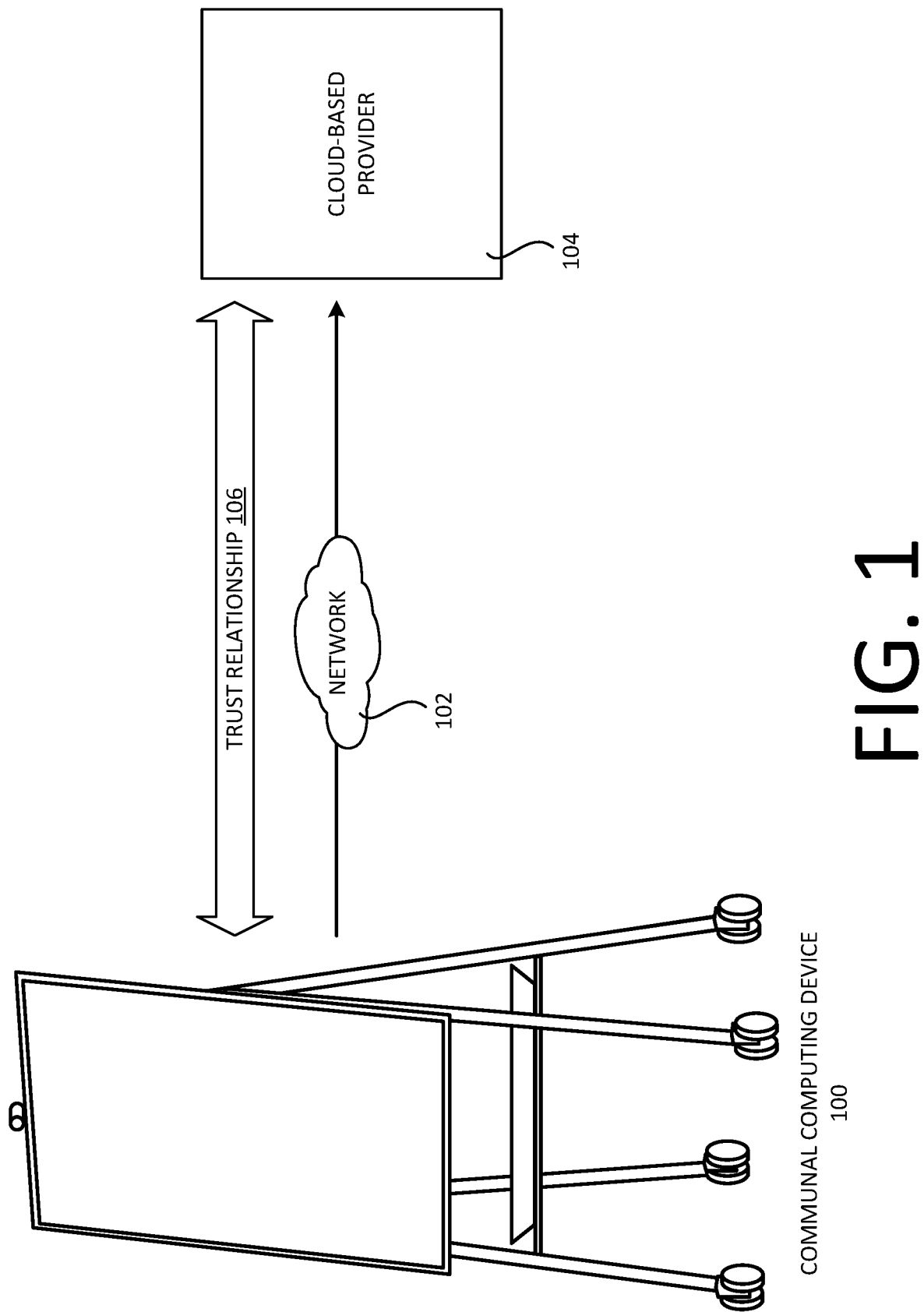
FIG. 1 is a diagram illustrating a trust relationship between a communal computing device and a cloud-based provider.

The following detailed description is directed to technologies for accessing unlocking and or logging in to a communal computing device by using multiple, detected identity signals. These techniques provide greater security because a user's personal device such as a smartphone can be used both to log in and log out of the communal computing device without the need for the user to directly interact with the communal computing device. Thus, the user does not need to provide passwords or other information sensitive information such as biometric enrollment data to the communal computing device. These techniques also provide an improved user experience by providing a friction-free way for one or more users to be identified by a communal computing device. Additionally, processor usage is reduced because existing passwords, biometric logins, and other authentication techniques that are already implemented on a user's personal device do not need to be replicated on the communal computing device. As will be described in greater detail below, both the communal computing device and the personal device have an established trust relationship with a trusted, cloud-based provider that manages trusted relationships. The shared trust relationship with the cloud-based provider allows the communal computing device to recognize authentication provided on the personal device.

As part of an enrollment process between the personal device of the user and the cloud-based provider, the user may provide low-fidelity identification data or non-personal identification data to the cloud-based provider. For example, the user may provide a standard photograph of his or her face using a visible-light camera (e.g., a self-snapshot) or a recording of the user speaking. As a further example, the user could provide a hardware ID such as a hardware serial number of a smartphone or an ID number from a radio-frequency identification (RFID) card such as an employee badge. These types of low-fidelity identification data may be associated with a user identity maintained by the cloud-based provider. The low-fidelity identification data can be stored by the cloud-based provider in a network-accessible location without the security concerns associated with storing passwords or high-fidelity identification data on a network location.

The communal computing device may also be registered with the cloud-based provider such that they form a trust relationship and the communal computing device "trusts" devices that are trusted by the cloud-based provider. When the user later comes into proximity to the communal computing device, the communal computing device can identify the user by comparing data it obtains with data available to the cloud-based provider such as a user profile. For example, the communal computing device might take an RGB (red, green, blue color model) photo of the user and/or detect the hardware ID of the user's personal device.

The communal computing device can then communicate with the cloud-based provider to determine if a match is found with the user's low-fidelity identification data (e.g. the previously stored photo or device hardware ID). To provide greater security and decrease the chance of misidentifying users, two or more low-fidelity identification signals may be required before a user is identified. For example, a user may be identified if a camera detects the face of the user in the proximity of the communal computing device and the hardware ID of the user's smartphone is also detected. Other low-fidelity signals that can contribute to identifying the user include calendar appointments and the reported location of the personal device. Thus, identification of a user can be made passively without any direct interaction between the user and the communal computing device. Identification, in particular identification based on multiple signals, may be highly reliable because it is unlikely that the user's personal device would be in proximity to the communal computing device and someone with a face that appears similar to the image in the "self-snapshot" photo would be in view of a camera on the communal computing device unless the user was present.

These techniques for identifying a user allow the communal computing device to recognize multiple users, such as in a conference room setting, without any of the users needing to touch or directly interact with the communal computing device. However, upon enrolling the personal device and/or establishing a user account with the cloud-based provider, the users are asked to opt-in to this passive identification functionality. Thus, without explicit user consent, the user will not be collected and identified by the communal computing device. The ability to be automatically recognized by mobile computing devices may be switched on or off by the user such as to an application setting on his or her personal device.

Unlocking the communal computing device or accessing additional functionality and data on the communal computing device may require active authentication by the user. This authentication is, however, provided on the personal device of the user rather than the communal computing device itself. The communal computing device can send a request for authentication to the cloud-based provider. In turn, the cloud-based provider can send a request for authentication to the user's personal device. If the user successfully authenticates on his or her personal device (e.g. provides a PIN, password, fingerprint, etc.), a signal is sent through the cloud-based provider to the communal computing device indicating that the user has been authenticated. The existing trust relationships between the personal device and the cloud-based provider as well as between the cloud-based provider and the communal computing device allow the authentication on the personal device to be accepted by the communal computing device. The communal computing device can then unlock for use by the user or, if already unlocked, provide additional functionality that includes access to personal data, a greater range of applications, and the like.

Logging out may also be implemented when one or more of identity signals are no longer detected by the communal computing device. For example, if a camera on the communal computing device no longer captures an image that includes a face of the user or if a signal from the personal device of the user is not received by the communal computing device the loss of either signal may be interpreted as the user having moved away from the communal computing device. If there is still at least one signal indicating presence of the user in proximity to the communal computing device, the communal computing device may send or cause the cloud-based provider to send a query to the personal device to confirm if the user is still present or not. If the user does not respond to this query or if all of the signals indicating presence of the user have stopped, then the communal can have device may automatically log off the user and clear any user data or preferences that may be stored locally. After user data is removed from the communal computing device, the user may receive a message on his personal device confirming that he has been logged out and his personal data deleted.

This technology is also not limited to use with a communal computing device such as an interactive digital whiteboard. For instance, a first user might be working on a laptop or on a desktop computer that is not typically used as a communal computing device. However, if a second user comes by the first user's desk, the second user may be identified by the first user's computer in the manner described above. The first user's computer can then modify its user interface to indicate that the second user has been identified. The modification may include showing a username of the second user, an icon representing the second user, or the like. The first user can select this identification to see, for example, public information or documents the two users were working on together (i.e., the documents that both users have accessed, edited, authored, etc.). The second user can be automatically signed out when she walks away from the first user computer.

The disclosed technologies are also applicable in the home context. For example, devices in a smart home can be unlocked for a user with the mechanism described above when she walks into her house. Once identified, the smart home ecosystem can recognize the user as having logged in and respond to the user's commands accordingly. Devices within the smart home ecosystem may each have a trust relationship with the cloud-based provider. Identification of the user by one device, such as a device that includes a camera and short-range radio-frequency connection, may be propagated to other devices the same ecosystem based on the shared trust relationship with the cloud-based provider. Thus, if one device that has a trust relationship with the cloud-based provider recognizes the user as being logged in, other devices at the same location with the trust relationship may also recognize the user as logged in.

As discussed briefly above, the disclosed technologies can provide limited access to identified users in a way that reduces the steps performed by the users to log in, thereby improving the user experience and providing greater convenience. Sharing trust relationships with a cloud-based service provides a way to securely authenticate on a first device, e.g. a smartphone, that is recognized by a second device such as an interactive digital whiteboard. Thus, use of the personal device as part of the authentication process increases system and data security because of the shared trust relationships and because the user is not asked to provide secure credentials such as a password to a computing device used by many other individuals or in the presence of other individuals. As a result, implementations of the disclosed technologies can improve human-machine interface activities and increase security as compared to previous technologies for accessing communal computing devices. Other technical benefits not specifically mentioned herein can also be realized through implementations of the disclosed subject matter.

FIG. 1 is a diagram illustrating a communal computing device 100 that communicates over a network 102 with a cloud-based provider 104 and has a trust relationship 106 with the cloud-based provider 104. The communal computing device 100 may be any type of computing device that is used simultaneously by multiple users or used by different users at different times. Examples of communal computing devices 100 include interactive digital whiteboards, smart televisions, computer systems in vehicles such as automobiles, computers at public locations such as libraries, computers that are borrowed for limited times such as at a school or business setting, computers at a location that are shared by multiple users such as a reception desk, etc. Interactive digital whiteboards include, for example, the SURFACE HUB and SURFACE HUB 2 by MICROSOFT CORPORATION.

The network 102 may be any type of communications network such as the Internet, a local area network, a wide area network, a peer-to-peer network, and may be implemented by any type of networking technology including wireless and wired networking technologies. The network 102 provides a communication path for data between the communal computing device 100 and the cloud-based provider 104.

The cloud-based provider 104 is a source of trusted identities for devices and users. The cloud-based provider 104 is one or more server computers or other physical or logical computing devices that are located at one or more physical locations. The cloud-based provider 104 may be implemented with redundant infrastructures so that if any server or other piece of hardware or equipment becomes non-functional, the role of that non-functional device is provided by a different device. The cloud-based provider 104 provides services over "the cloud" which is via a network connection to the device(s) receiving the services. A trusted relationship between a device and the cloud-based provider 104 might be established if the cloud-based provider 104 can communicate securely with the device, for example, through the use of public/private key cryptography. The existence of a trust relationship allows a computing device to rely on user identification and authentication determinations made by another computing device with which it shares the trust relationship.

The cloud-based provider 104 may be located remote from the communal computing device 100 so that it is isolated from physical security threats to the communal computing device 100. For example, the cloud-based provider 104 may be implemented as one or more network-accessible servers that can be accessed from any location connected to the network 102. One example of a cloud-based provider that manages trust relationships is the AZURE IDENTITY network service by MICROSOFT CORPORATION.

Figure 2:
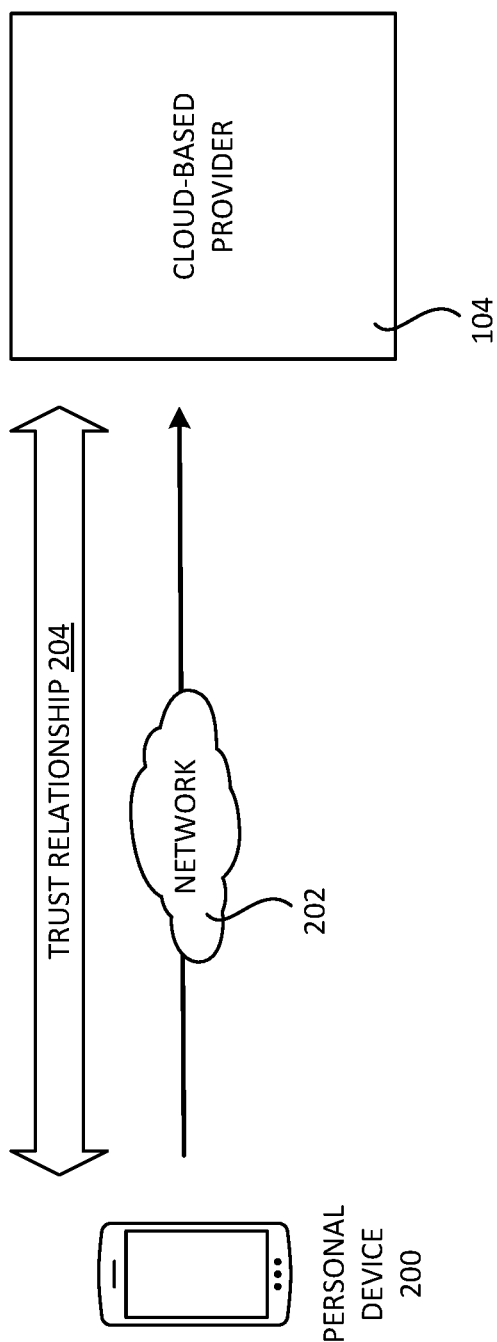
FIG. 2 is a diagram illustrating a trust relationship between a personal device and the cloud-based provider.

FIG. 2 is a diagram illustrating a personal device 200 that communicates via a network 202 to and has a trust relationship 204 with the cloud-based provider 104. The personal device 200 is a device that is associated with and typically used only by a single user. Examples of personal devices 200 include smartphones, personal digital assistants, media players, tablet computers, smart watches, and the like. Personal devices 200 may be implemented in any number of different form factors such as mobile devices, wearable devices, implantable devices, etc. Personal devices 200 typically include at least basic computing capability and are equipped with one or more processors, one or more types of memory, and input/output devices as well as hardware such as an antenna that can implement network connectivity.

The trust relationship 204 can be a pre-established trust relationship based on enrollment or registration of the personal device 200 with the cloud-based provider 104. The trust relationship 204 between the personal device 200 and the cloud-based provider 104 may be the same as the trust relationship 106 between the communal computing device 100 and the cloud-based provider 104. Enrollment may include creating a biometric log in to the personal device 200 such as by setting up a fingerprint reader or other sensor capable of capturing biometric information. The biometric data can be securely stored under the user's control on his or her personal device 200. Additionally, once the hardware on the personal device 200 is set up to accurately recognize the user's biometrics, the recognition by the personal device 200 may be used to access not only the personal device 200 but also the communal computing device 100 and other devices that also have a trust relationship with the cloud-based provider 104.

Registration may include communicating information about the personal device 200 to the cloud-based provider 104 such as a unique device identifier. The unique device identifier may be, for example, a hardware ID, a serial number, a phone number, etc. The pre-established trust relationship may be implemented by establishing a secure communication channel between the personal device 200 and the cloud-based provider 104 such as through the use of public/private key encryption. Additionally, installation of a software token recognized by the cloud-based provider 104 on the personal device 200 may be part of creating the pre-established trust relationship.

The network 202 provides a communicative connection between the personal device 200 and the cloud-based provider 104. The network 202 may be implemented as any type of network such as the Internet, a cellular network, a wired telephone network, a peer-to-peer network, etc. The personal device 200 may have a wireless connection with the network 202 such as a connection communications protocol that uses radio frequencies such as wireless fidelity (WI-FI), BLUETOOTH, or another wireless communication technology. The network 202 may be the same or different than the network 102 introduce FIG. 1.

The cloud-based provider 104 is the same as the cloud-based provider 104 introduced in FIG. 1. However, the communal computing device 100 and the personal device 200 may access different hardware or different physical servers that are both parts of the same cloud-based provider 104. Thus, even if the communal computing device 100 and the personal device 200 cannot directly communicate with each other because they use different networks, both are able to communicate with the cloud-based provider 104. The trust relationship 204 between the personal device 200 and the cloud-based provider 104 allows the cloud-based provider 104 to recognize and trust communications from the personal device 200. The personal device 200 may be identified as a member of the trust relationship 204 based on a characteristic of the personal device 200 such as a hardware ID and/or based on an identity of a user associated with the personal device 200.

Figure 3:
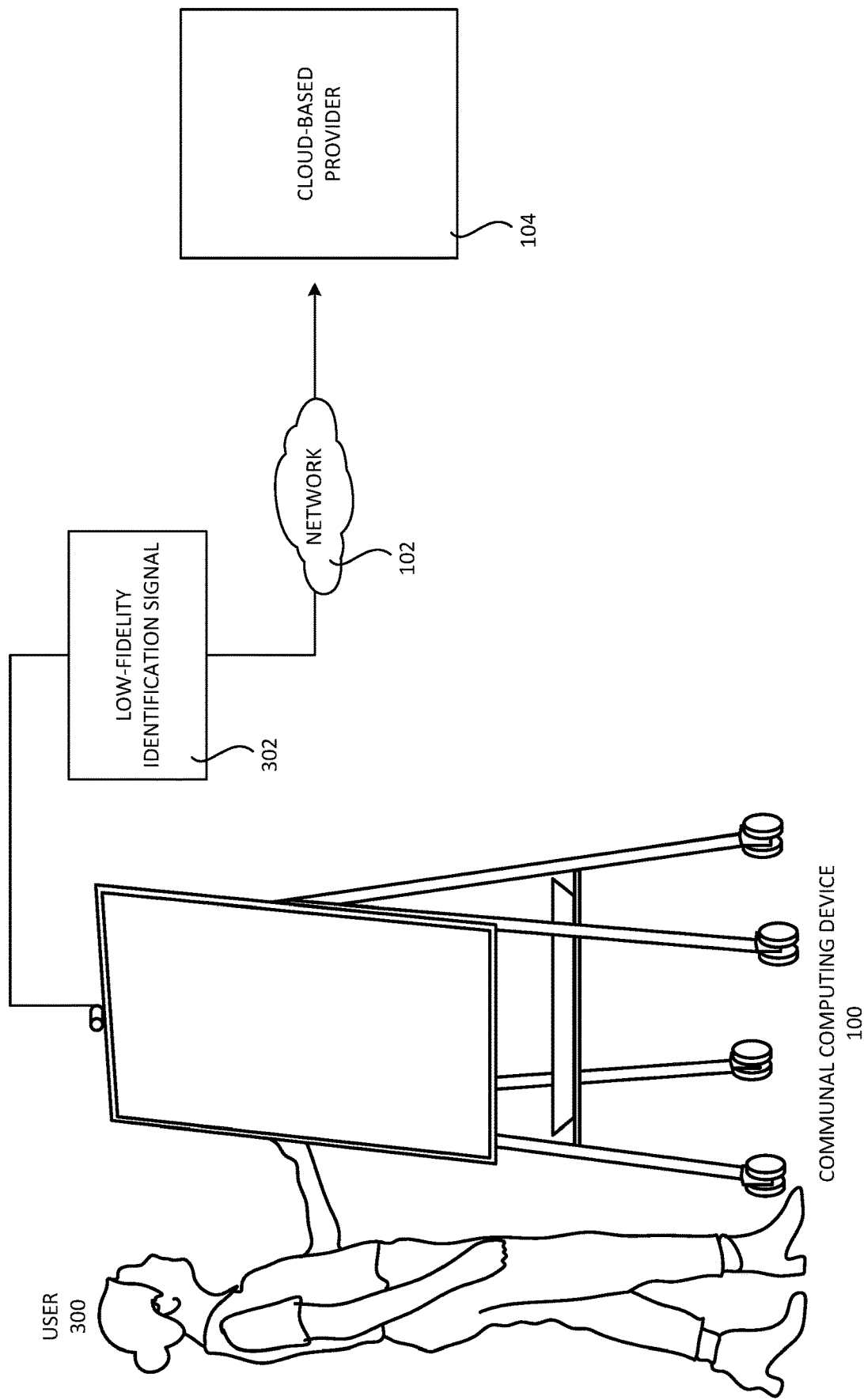
FIG. 3 is a diagram showing transmission of a low-fidelity identification signal from the communal computing device to the cloud-based provider.

FIG. 3 is a diagram illustrating a user 300 in proximity to the communal computing device 100. The user 300 may be detected in the proximity of the communal computing device 100 by a sensor on the communal computing device 100 such as a camera or microphone. The user 300 may be determined to be "proximate" to the communal computing device 100 when the user 300 is within a threshold distance such as one meter, two meters, three meters etc. Proximity may also be based on the detection threshold of the sensor. For example, the user 300 may be considered "proximate" to the communal computing device 100 when the user is close enough that a camera on the communal computing device 100 can form an image of the face of the user 300. Thus, the communal computing device 100 may detect the presence of the user 300 without any direct user interaction.

When the user 300 is detected in proximity to the communal computing device 100 by a sensor or wireless communications interface on the communal computing device 100, data describing a low-fidelity identification signal may be sent from the communal computing device 100 via the network 102 to the cloud-based provider 104. The low-fidelity identification signal 302 communicates data captured by the communal computing device 100 (e.g., an image or audio) to the cloud-based provider 104. The captured audio data may be of short duration (e.g., less than five seconds) or low quality (e.g., sample rate ≤20 kHz). The cloud-based provider 104 can, as described below, evaluate the low-fidelity identification signal 302 to identify the user 300.

The low-fidelity identification signal 302 is a first identification signal that identifies the user 300. This first identification signal may function as a first factor for multi-factor authentication. The low-fidelity identification signal 302 obtained by the communal computing device 100 may be a biometric signal such as a visual-light image of the face of a person or an audio recording of the voice of a person proximate to the communal computing device 100. The low-fidelity identification signal 302 may include information that the user 300 does not consider private, can be obtained without direct user interaction with the communal computing device 100, and may be stored by the cloud-based provider 104. The low-fidelity identification signal 302 may also be generated by data accessible to the communal computing device 100 without the use of sensors. For example, scheduling information such as a shared calendar may identify which people are likely to be present in the same room as the communal computing device 100 at a particular time. The communal computing device 100 may make inferences from this type of information to identify the user 300 as one of the people identified in, for example, the calendaring data.

The low-fidelity identification signal 302 may be contrasted with a high-fidelity identification signal. For example, the low-fidelity identification signal 302 may have the characteristic of a false acceptance rate or false rejection rate of around 1:1000, of around 1:5000, or of around 1:10,000. Thus, one out of every 1000 low-fidelity identification signals 302 may incorrectly identify the user 300 as a different person. In contrast, high-fidelity identification signals have a false acceptance/false rejection rate of 1:100,000 or lower.

While the lower level of accuracy for the low-fidelity identification signal 302 may be inadequate as the sole basis for logging in a user to the communal computing device 100, it is also relatively low-value information that is less risky to share with the communal computing device 100 and/or have stored on the cloud-based provider 104. Although a high-fidelity identification signal could provide greater confidence in identification of the user 300, many users may be reluctant to provide a password to a device that is used by many other people or to allow the cloud-based provider 104 to store high-fidelity biometric information like a detailed infrared (IR) image of the user's face.

Figure 4:
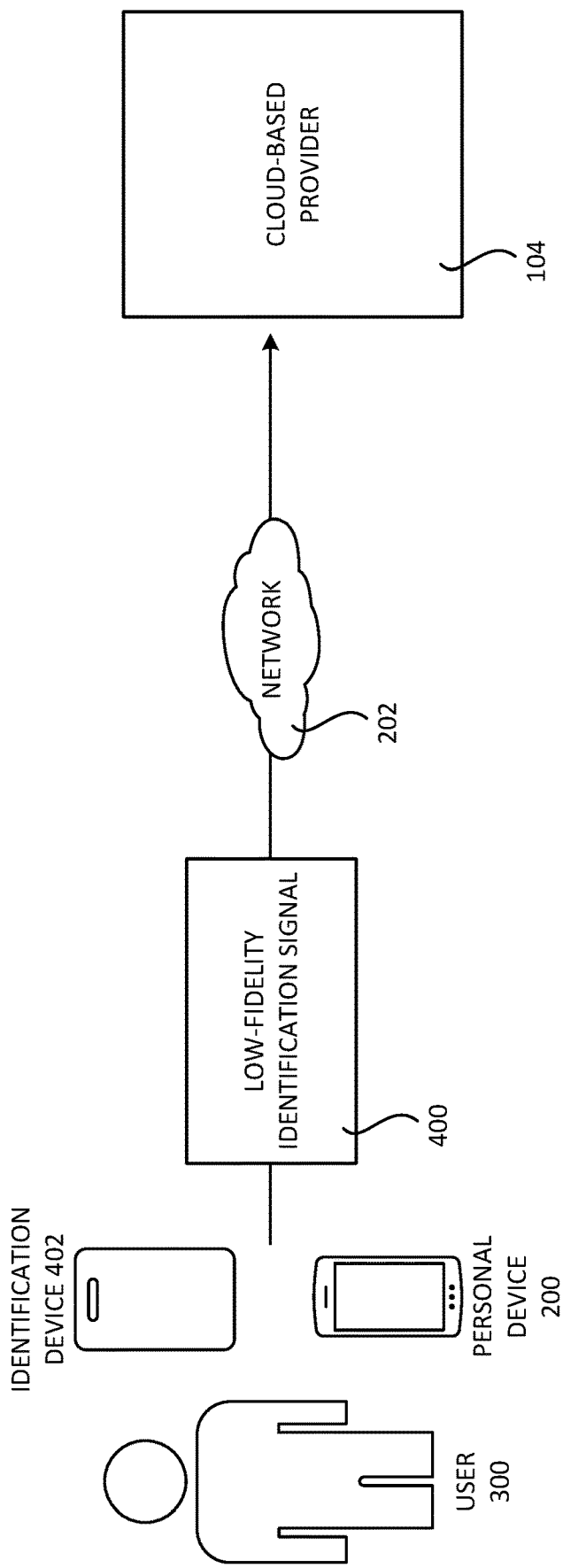
FIG. 4 is a diagram showing a transmission of a low-fidelity identification signal from a mobile device to the cloud-based provider.

FIG. 4 is a diagram showing a low-fidelity identification signal 400 being provided by a device other than the communal computing device 100, such as an identification device 402 or the personal device 200. The identification device 402 and the personal device 200 are both examples of mobile devices which include any type of device that may be readily carried by the user 300. For example, mobile devices include laptop computers, tablet computers, smart watches, keychain fobs, hearing aids, wearable devices, implantable medical devices, etc. At a minimum, mobile devices are a source of unique, mobile device identifiers (contrast with biometric identifiers) that can be associated with a user identity of the user 300.

The identification device 402 is a device that provides an identifier that is associated with the user 300. The identification device 402 may be a security token that is a small hardware device which includes a number that uniquely identifies the user 300 associated with the identification device 402. For example, the identification device 402 may be implemented as a contactless smart card that uses a wireless technology such as near field communication (NFC) or radio frequency identification (RFID) to communicate an ID number. The identification device 402 is not necessarily a computing device in that it may lack a processor and/or memory as well as input or output devices.

The personal device 200 may also be the source of a low-fidelity identification signal 400. The personal device 200 may provide a device-specific identifier such as a hardware ID, a serial number, or an integrated circuit card identifier (ICCID) from a subscriber identification module (SIM). Additionally, the personal device 200 may provide an account-specific identifier such as a phone number, a username, an email address, or the like.

The low-fidelity identification signal 400 obtained from a mobile device such as the identification device 402 or the personal device 200 is communicated via the network 202 to the cloud-based provider 104. Correlation between any number, code, account name, etc. provided in the low-fidelity identification signal 400 with an identity of the user 300 may be stored or accessible by the cloud-based provider 104. Thus, when a hardware ID is received by the cloud-based provider 104, it can use a lookup table or other technique to correlate that hardware ID with a user identity.

Of course, it is possible that someone other than the primary user of a mobile device may have possession of the device and approach a communal computing device 100. In this circumstance, detection of the mobile device does not indicate the presence of the user 300. Thus, the inference that the user 300 is present if the mobile device is present may hold true in most circumstances but it may not be robust enough to use as the sole criterion for logging in the user 300 to the communal computing device 100.

Figure 5:
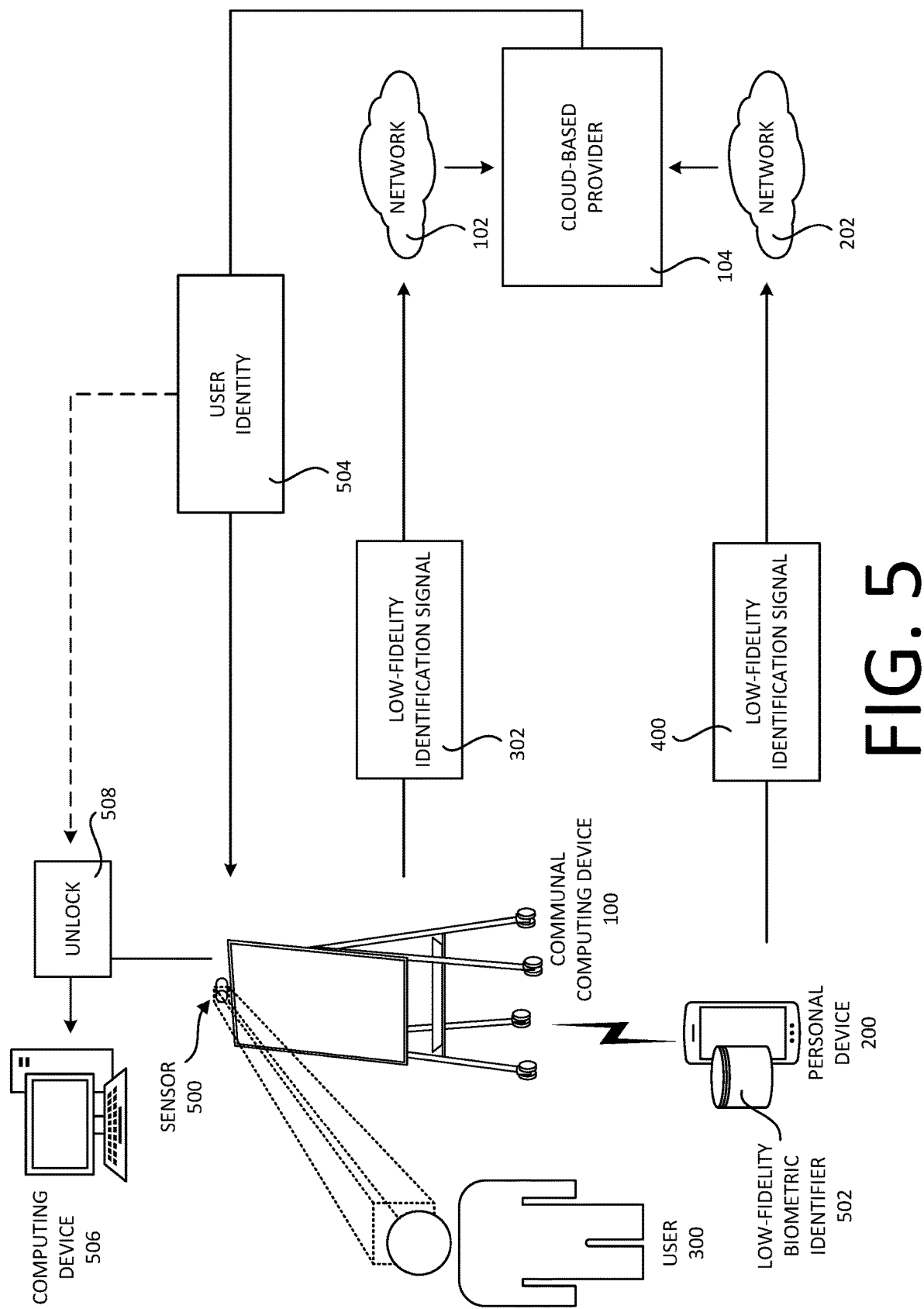
FIG. 5 is a diagram showing the identification of a user based on multiple low-fidelity identification signals and unlocking of computing devices that share a trust relationship with the cloud-based provider.

FIG. 5 shows identification of the user 300 based on multiple low-fidelity identification signals 302, 400. Each low-fidelity identification signal 302, 400 may have a moderately high probability of being incorrect (e.g., 1:5000 error rate). In an implementation, two or more low-fidelity identification signals 302, 400 may be used to confirm the identity of the user 300. Use of a greater number of separate signals provides greater confidence in the identity of the user 300.

In this example, the communal computing device 100 provides a first low-fidelity identification signal 302 via the network 102 to the cloud-based provider 104. This first low-fidelity identification signal 302 may be a biometric signal captured by a sensor 500 of the communal computing device 100. This low-fidelity biometric signal may be, for example, a visual-light image of the face of the user 300 or a recording of audio that includes the sound of the voice of the user 300.

The personal device 200 provides a second low-fidelity identification signal 400 via the network 202 to the cloud-based provider 104. For example, the second low-fidelity identification signal 400 provided by the personal device 200 may be a hardware ID of the personal device 200.

With these two low-fidelity identification signals 302, 400, the cloud-based provider 104 may be able to determine the identity of the user 300 with a much higher probability of accuracy than using either signal alone. The cloud-based provider 104 may determine if a user identity correlated with the first low-fidelity identification signal 302 matches the user identity correlated with the second low-fidelity identification signal 400. For example, the cloud-based provider 104 may identify that the picture of a person's face captured by the sensor 500 is the same user 300 that is associated with the hardware ID provided from the personal device 200. If there is a match, then the person proximate to the communal computing device 100 is identified as the user 300.

This matching may be implemented by use of a profile or account of the user 300 that is available to the cloud-based provider 104. The profile may include a self-snapshot picture of the user 300 provided earlier during enrollment and other information about the user's devices such as the hardware ID of the personal device 200. Facial recognition may be performed by the cloud-based provider 104 to determine that the image captured by the communal computing device 100 is the same face included in the picture stored with the user's account and may also match the hardware ID provided in the low-fidelity identification signal 400 with the hardware ID stored in the user's account.

An implementation, a low-fidelity biometric identifier 502 such as a visual-light image or voiceprint may be stored locally on the personal device 200. This data may be provided to the communal computing device 100 via a direct connection such as BLUETOOTH or other wireless communication protocol. The communal computing device 100 may then attempt to match the low-fidelity biometric identifier 502 received from the personal device 200 with the data captured by it sensor 500. If there is a match, the communal computing device 100 may interpret that as indicating that the person proximate to the sensor 500 is, in fact, the user 300 associated with the personal device 200.

Although facial recognition based on two-dimensional images of a person's face created by a visual-light camera (e.g. a standard smartphone camera using RGB or similar color space) can be spoofed using a printed image of the face or other technique, this level of low-fidelity identification may be sufficient to identify the user 300 when used together with a second low-fidelity identification signal 400. Although it is possible that someone other than the user 300 may have brought the personal device 200 into proximity of the communal computing device 100, using both the hardware ID and a biometric identifier increases confidence in the identification.

If the two (or more) low-fidelity identification signals 302, 400 both indicate the same user 300, the cloud-based provider 104 may communicate a user identity 504 to the communal computing device 100. Due to the existing trust relationship between the communal computing device 100 and the cloud-based provider 104, the communal computing device 100 relies upon the user identity 504 provided by the cloud-based provider 104 to unlock the communal computing device 100 for use by the user 300.

With this identification technology, the user 300 is able to begin using the communal computing device 100 without a cumbersome, time-consuming, or insecure (e.g. entering a password in front of other users) login process. Although not shown in FIG. 5, the communal computing device 100 may identify and interact with multiple simultaneous users. For example, each of the people present in a conference room may be identified by the communal computing device 100 by matching low-fidelity identification signals 302 obtained from the sensor 500 of the communal computing device 100 and low-fidelity identification signals 400 obtained from personal devices 200 of the users. Each user identity that is matched to low-fidelity identification signals 302, 400 from two different sources will be logged into the communal computing device 100.

Once the user 300 has been identified to the communal computing device 100, other computing devices 506 in the same area as the communal computing device 100 may also recognize the user 300. For example, a desktop computer, conferencing system, printer, etc. that are in the same room or nearby the communal computing device 100 may receive an unlock signal 508 from the communal computing device 100. The unlock signal 508 may instruct the computing device 506 to unlock and become available for use by the user 300. Unlocking may be implemented by logging in the user 300 to the computing device 506. The computing device 506 may have a trust relationship with the communal computing device 100 that causes it to recognize any users logged into the communal computing device 100. In an implementation, the computing device 506 may also have a trust relationship with the cloud-based provider 104 and recognition of the user 300 by the cloud-based provider 104 may result in the user identity 504 being sent to the computing device 506 which results in the computing device 506 being unlocked for the user 300.

Figure 6:
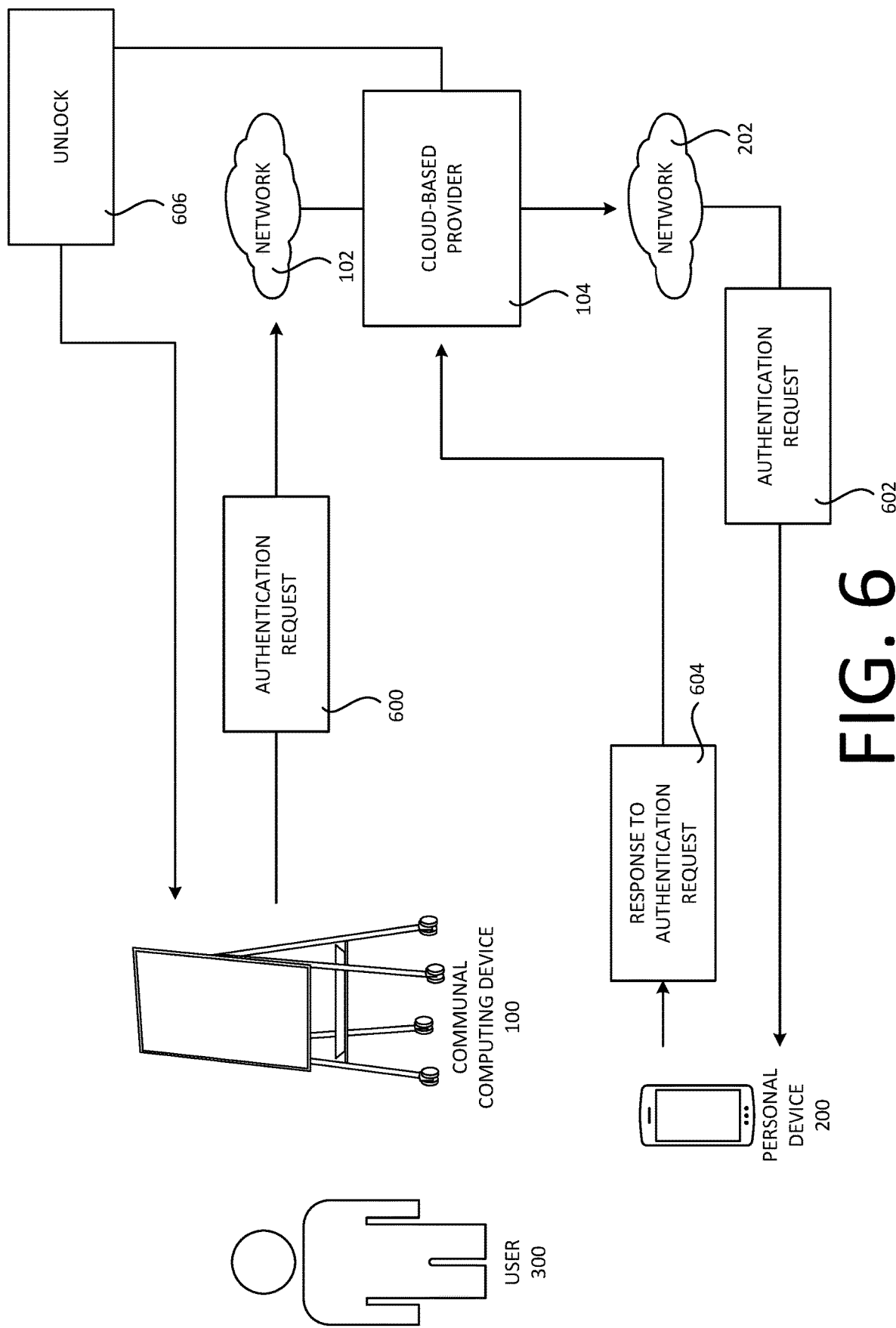
FIG. 6 is a diagram showing use of the personal device for authentication of the user on the communal computing device.

FIG. 6 is a diagram showing authentication of the user 300 to the communal computing device 100. As discussed above, traditional techniques for authenticating on a computing device may be cumbersome or insecure when used on a communal computing device 100. For example, the user 300 may wish to avoid typing her password on a large touchscreen that is being viewed by multiple other users. Similarly, biometric security typically requires a per-device enrollment so the user 300 would need to go through a potentially lengthy enrollment process with specific hardware on the communal computing device 100. This may be inefficient resulting in consumption of processing cycles and energy if, for example, the user 300 needs to enroll his or her biometric information on a different laptop computer each day at school or work. Furthermore, due to the highly secure nature of biometric data, it may be undesirable to store it on a communal computing device 100 (or the cloud-based provider 104) that is used by others and not physically controlled by the user 300. Also, including biometric hardware on the communal computing device 100 may increase manufacturing costs.

In order to confirm the identity of the user 300, the communal computing device 100 can send an authentication request 600 through the network 102 to the cloud-based provider 104 to solicit a second factor for identification. The authentication request 600 may include the presumed identity of the user 300 as indicated by one of the low-fidelity identification signals 302, 400. The cloud-based provider 104 may identify the personal device 200 associated with a user profile that matches the user identity provided in the authentication request 600. The cloud-based provider 104 can then send an authentication request 602 through the network 202 to the personal device 200 requesting the user of the personal device 200 provide a second factor for authentication. Thus, because the authentication requests 600, 602 are mediated by the cloud-based provider 104, it is not necessary for the personal device 200 and the communal computing device 100 to have undergone any pairing or device-to-device communication.

The authentication request 602 received at the personal device 200 may ask the user 300 to enter a PIN, password, interact with a biometric sensor, perform a predetermined gesture or otherwise provide a strong signal which serves as a second factor for confirming his or her identity. The personal device 200 may include a biometric sensor that is already enrolled with the user's biometric profile such as a three-dimensional depth camera, an IR camera, a microphone array, a fingerprint sensor, or the like. In an implementation, sensors on the communal computing device 100 may be used to detect the pre-determined gesture or other second factor without necessarily relying upon the personal device 200.

The user 300 provides a response 604 to the authentication request and that response 604 is returned to the cloud-based provider 104. The response 604 may be the entry of a PIN or password. For biometric identification, the response 604 is the signal generated by the user 300 interacting with the biometric hardware on the personal device 200.

The cloud-based provider 104 evaluates the response 604 to the authentication request 602 to determine if it matches information stored in a user profile of the user 300. For example, a hash of the PIN or password may be compared to a stored hash. If there is a match, then the cloud-based provider 104 generates an unlock signal 606 instructing the communal computing device 100 to unlock for use by the user 300.

Additionally, or alternatively, the personal device 200 may indicate that the user 300 has successfully authenticated such as by comparing signals collected from biometric hardware with enrolled data previously stored on the personal device 200. The authentication signal sent from the personal device 200 to the cloud-based provider 104 may be trusted by the cloud-based provider 104 and forwarded to the communal computing device 100 because of the trust relationship 204 between the personal device 200 and the cloud-based provider 104. If the response 604 to the authentication request is not correct, the cloud-based provider 104 may instruct the communal computing device 100 to remain locked or, if the user 300 has already logged on, to log off the user 300.

In response to the cloud-based provider 104 providing the unlock signal 606 to the communal computing device 100, the communal computing device 100 may enable access by the user 300. The trust relationship 204 between the personal device 200 and the cloud-based provider 104 together with the trust relationship 106 between the communal computing device 100 and the cloud-based provider 104 allows the communal computing device 100 to trust the unlock signal 606 even though the user 300 has not authenticated directly with the communal computing device 100.

Figure 7:
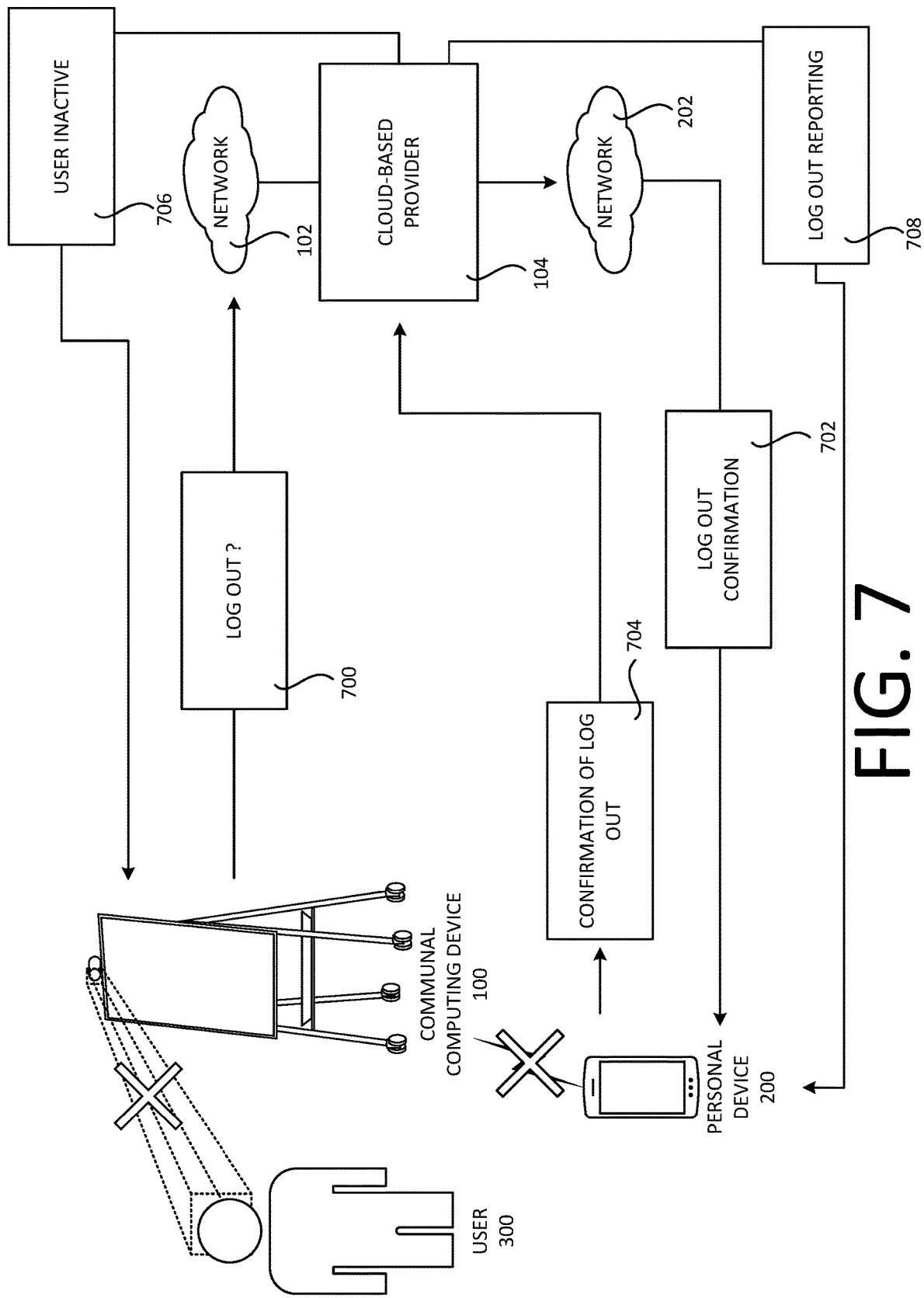
FIG. 7 is a diagram showing logging-out of the communal computing device.

FIG. 7 is a diagram showing the communal computing device 100 determining if the user 300 should be logged out when the user 300 or the personal device 200 is no longer detected in the proximity of the communal computing device 100. If the user 300 is finished using the communal computing device 100, then user 300 may affirmatively log out such as by activating a button, soft button, or UI element on the communal computing device 100 indicating her desire to log out. Additionally, or alternatively, the user 300 may also interact with the personal device 200 to generate a logout command that is either sent directly from the personal device 200 to the communal computing device 100 or communicated via the cloud-based provider 104.

However, the communal computing device 100 also provides a way for the user 300 to automatically log out if she moves away from the communal computing device 100 without first affirmatively logging out. If one or more of the signals indicating the identity of the user are no longer detected by the communal computing device 100, then the communal computing device 100 may generate a logout query 700. For example, if a camera or other sensor on the communal computing device 100 ceases to detect the user 300, this may trigger the communal computing device 100 to generate the logout query 700. Also, if the personal device 200 or other mobile device associated with the user 300 is no longer detected in proximity of the communal computing device 100, this can also trigger the communal computing device 100 to generate the logout query 700.

In an implementation, if any single low-fidelity identification signal ceases to be detected by the communal computing device 100, that triggers sending of the logout query 700. In an implementation, if all low-fidelity identification signals cease to be detected by the communal computing device 100, that will trigger sending of the logout query 700. In this implementation, the user 300 may intentionally choose to leave his or her personal device 200 in the room with the communal computing device 100 to avoid being logged out when he or she briefly leaves the room with the communal computing device 100. Other configurations for triggering log out are also possible such as ceasing to detect two or more low-fidelity identification signals or ceasing to detect one low-fidelity biometric identity signal and one device identifier of a mobile device.

The communal computing device 100 sends the logout query 700 to the network 102 and to the cloud-based provider 104. The cloud-based provider 104 sends a logout confirmation 702 to the personal device 200 via the network 202. The logout confirmation 702 may cause the personal device 200 to generate a query for the user 300 asking if he or she intends to log out of the communal computing device 100. The query for the user 300 may be generated by the personal device 200 using any suitable output technique such as a UI element on a screen or an audio message. The user 300 may respond to the personal device 200 by indicating a desire to log out or not. If the user 300 indicates on the personal device 200 that she wishes to log out, then the personal device 200 sends a confirmation of log out 704 back to the cloud-based provider 104.

Logging out is not, however, necessarily a binary condition. The user 300 may be partially logged out or partially de-authenticated. There may be circumstances in which the user 300 has moved away from the communal computing device 100 but does not wish to fully log out. For example, if the user 300 briefly leaves a meeting room that includes the communal computing device 100 but intends to return soon, she may wish to allow other users of the communal computing device 100 to continue without interruption. In this circumstance, failure to generate a confirmation of log out 704 may prevent the communal computing device 100 from completely logging the user 300 out. Partially logging out may keep the user data, profile, and other functionality available on the communal computing device 100. In an implementation, a portion of the data associated with user identity may be removed while other data may be retained by the communal computing device 100. Partially logging out may limit the ability of other users on the communal computing device 100 to access additional data associated with the user 300 who is partially logged out. The limits on how other users of the communal computing device 100 may interact with data associated with the user profile of a partially logged out user may be configured by the user 300. For example, the user 300 may allow other users to view and modify open documents but not to save the documents or to open any new documents that are owned by the user 300.

Upon receiving the confirmation of log out 704 from the personal device 200, the cloud-based provider 104 can send a user inactive indication 706 to the communal computing device 100. Receipt of the user inactive indication 706 causes the communal computing device 100 to log the user 300 out. Upon log out of the user 300, at least one feature or at least a portion of the data associated with the user identity is removed from the communal computing device 100. For example, any customizations or personalizations made to the communal computing device 100 interface based on the user identity may be removed and any private data associated with the user 300 may be removed from the communal computing device 100.

The user inactive indication 706 may also be sent by the cloud-based provider 104 based upon the cessation of one of the low-fidelity identification signals together with the passage of a threshold amount of time. Thus, if the user 300 and/or the personal device 200 is not detected in the proximity of the communal computing device 100 and more than a threshold period of time elapses (e.g., five minutes, 10 minutes, 15 minutes, 20 minutes, etc.), then the cloud-based provider 104 may send the user inactive indication 706 even if it has not received the confirmation of log out 704. Thus, if the user 300 fails to respond to the logout confirmation 702 or moves away from the communal computing device 100 but forgets his or her personal device 200 on the table, the user 300 will not remain logged in indefinitely.

The user 300 may be unsure if he or she has been logged out of the communal computing device 100. This may be of particular concern on public devices that are used by multiple of the users who are not associated with the user 300. The cloud-based provider 104 may generate a log out reporting signal 708 that communicates to the personal device 200 the status of the user identity as currently logged out of the communal computing device 100. The log out reporting signal 708 may also indicate the time when the user identity was logged out of the communal computing device 100 and indicate the functionality and/or data that is removed from the communal computing device 100. Providing an affirmative, descriptive indication of the status of the user 300 as being logged out from the communal computing device 100 provides the user with assurance that he or she has effectively logged out.

Figure 8:
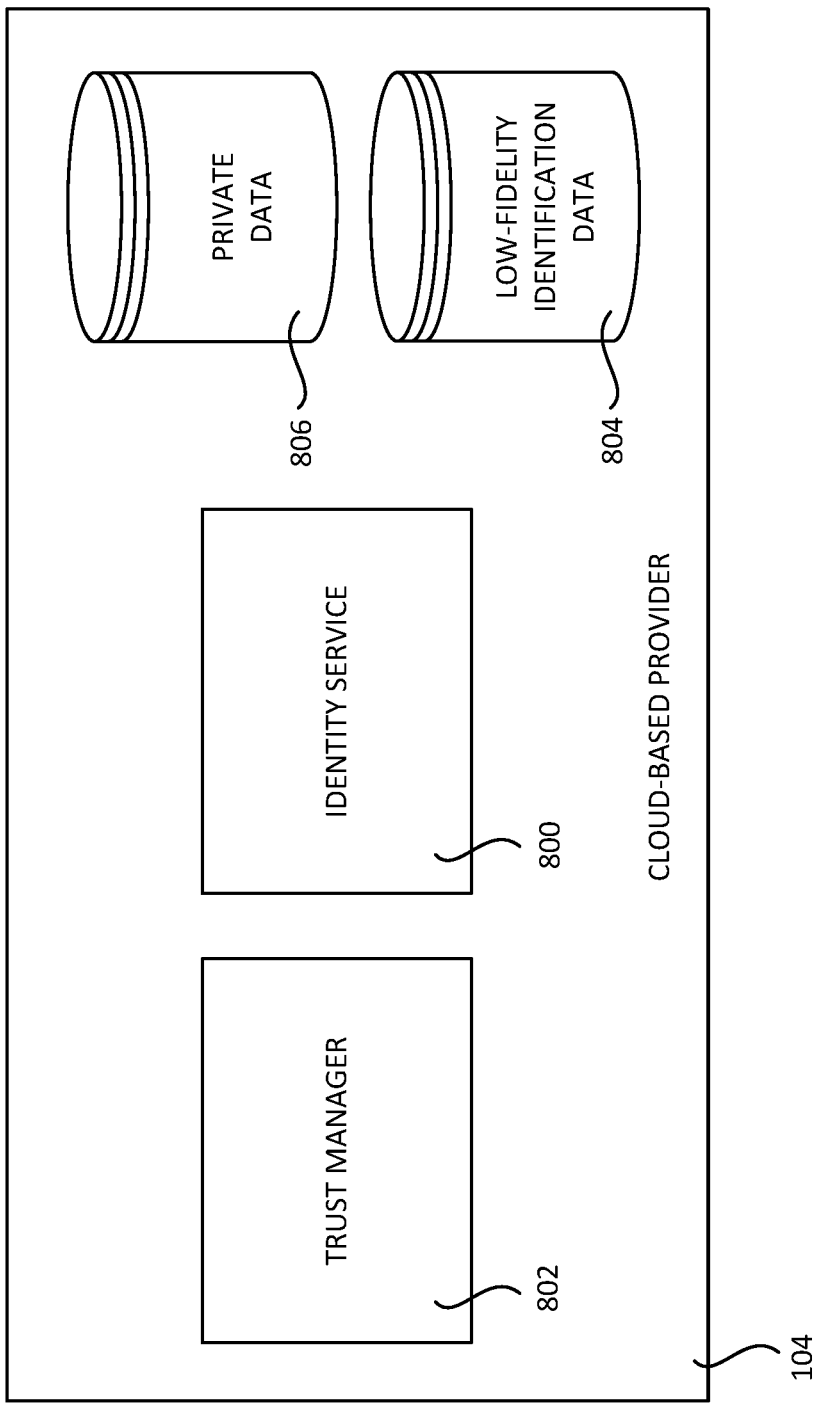
FIG. 8 is a schematic diagram showing functionality and data associated with the cloud-based provider.

FIG. 8 is a diagram showing an illustrative configuration of aspects of the cloud-based provider 104. The cloud-based provider 104 may be implemented on one or more physical or logical computing devices located at a single site or distributed across multiple physically separate sites. The cloud-based provider 104 includes a centrally-managed identity service 800. The centrally-managed identity service 800 may maintain secure records of user and device identities that can be referenced to verify that a given user or device is, in fact, the user/device known to the centrally-managed identity service 800. The centrally-managed identity service 800 may be managed by a third party that is separate from the user 300 and owner of the communal computing device 100. For example, the centrally-managed identity service 800 may be a service that provides digital IDs or digital signature certificates. One example of the centrally-managed identity service 800 is the AZURE ACTIVE DIRECTORY service from MICROSOFT CORPORATION.

The cloud-based provider 104 may also include a trust manager 802 that manages the trust relationships 106, 204 with the communal computing device 100, the personal device 200, and any other devices that share a trust relationship with the cloud-based provider 104. The trust relationships 106, 204 may be the basis for verifying the identity of the user 300. For example, the trust manager 802 may send the unlock signal 606 to the communal computing device 100 that instructs the communal computing device 100 to unlock when the cloud-based provider 104 has received a valid authentication from the personal device 200. The cloud-based provider 104 in conjunction with the trust manager 802 can operate as a cloud-based trust entity that maintains user identities and regulates access to the user identities and associated data.

The trust relationship 106, 204 may be initiated by an owner or manager of the relevant device such as by installing software that enables secure and trusted communication with the cloud-based provider 104. Forming a trust relationship 106, 204 may enable the trust manager 802 to push out software to trusted devices. Both the trust manager 802 and any software installed locally on trusted devices may be used to enforce policies for trusted devices (e.g., the communal computing device 100 and personal device 200). For example, the policies may require passwords to have certain characteristics and specify the frequency with which passwords are changed. Policies may also require devices use a certain communications protocol and/or level of encryption when communicating with other trusted devices. Additionally, policies could include such things as requiring users of personal devices 200 to take a photo of themselves (e.g., a self-snapshot for low-fidelity facial recognition) before extending trust to the personal device 200.

The cloud-based provider 104 may also store low-fidelity identification data 804. The low-fidelity identification data 804 may be compared to the low-fidelity identification signals 302, 400 received from the communal computing device 100 and or the personal device 200. If there is a match between the stored data and received data, then the user 300 is identified with one of the user identities by the centrally-managed identity service 800. The low-fidelity identification data 804 may include, for example, a visible-light photograph of the user 300 for use in facial recognition, a voiceprint of the user 300 for use in voice identification, a device ID of the personal device 200, and a serial number of an identification device 402.

Private data 806 of the user 300, and other users, may also be stored on the cloud-based provider 104 or accessible to the cloud-based provider 104. The private data 806 may include user files, account login information for services and programs such as email, and personal information about the user 300 such as full name, age, contact information, etc.

Figure 9:
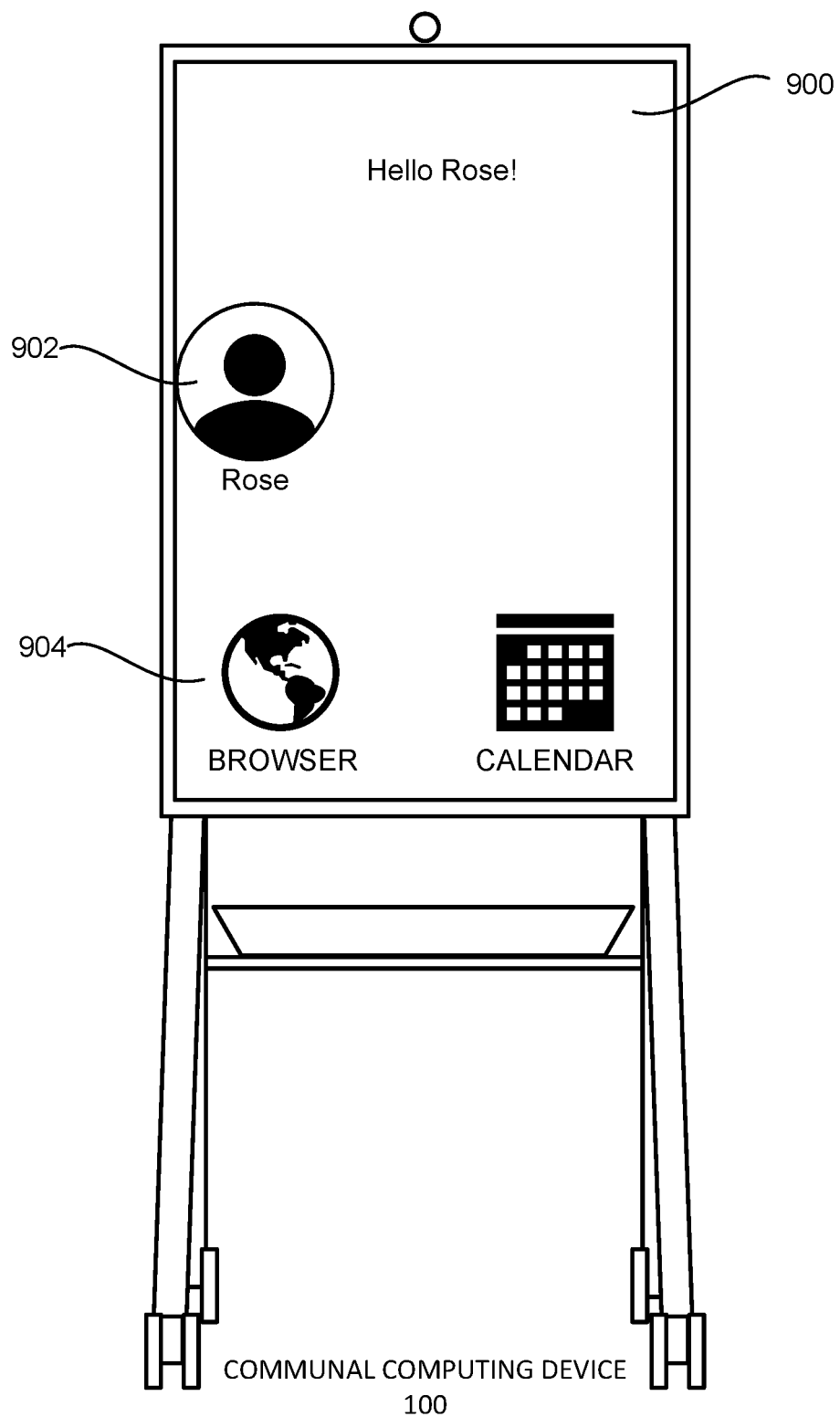
FIG. 9 is a user interface diagram showing an illustrative user interface presented by the communal computing device when a user is recognized.

FIG. 9 shows an illustrative UI 900 that may be presented on the communal computing device 100 when the user 300 is identified. The UI 900 may be changed upon identification of the user 300 to include a user icon 902 representing the user identity of the user 300. The user icon 902 may include, for example, an image selected by the user 300 (e.g., an "avatar") and a username. If the communal computing device 100 has identified multiple users in its proximity, a user icon 902 may be generated for each of the identified users. Selection of the user icon 902 may enable access to other features associated with the user identity such as access to documents associated with the user and the ability to authenticate on the communal computing device 100. The UI 900 has been simplified for discussion purposes and might include additional information or be configured differently than that shown in FIG. 9.

The user 300 once logged in may have access to programs 904 on the communal computing device 100 such as, for example, a browser and a calendar. Thus, the user 300 may be passively identified and gain access to certain features on the communal computing device 100 such as programs 904 without needing to affirmatively log in. This may be referred to as "ambient identification" in which the user is recognized based on a passive identification signal such as his or her face, voice, an identifier transmitted by a mobile device, or combination thereof.

FIGS. 10A—E illustrate a flow diagram of a process 1000 for identifying a user 300 to a communal computing device 100. It should be appreciated that the logical operations described herein with regard to the flow diagram can be implemented (1) as a sequence of computer implemented acts or program modules running on a computing device and/or (2) as interconnected machine logic circuits or circuit modules within a computing device.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

At 1002, a low-fidelity biometric feature of a person in proximity to a communal computing device 100 is detected. As illustrated in FIG. 1, the communal computing device 100 has a trust relationship 106 with a cloud-based provider 104. The low-fidelity biometric feature may be a biometric feature that has a false acceptance rate and false rejection rate of less than about 1:20,000. For example, the low-fidelity biometric feature may be a visual-light image of the face of a user 300. The trust relationship may, for example, share user identification and user authentication data between the communal computing device 100 and the cloud-based provider 104. The communal computing device 100 may be an interactive digital whiteboard in some implementations. The cloud-based provider 104 may include the data and functionality illustrated in FIG. 8.

At 1004, an identity of the person is determined based on the low-fidelity biometric feature. For example, facial recognition techniques may be used to match an image captured by a camera on the communal computing device 100 with a previously-obtained visual-light image of the user 300. This match identifies the person standing in front of the camera as the user 300. Of course, there is a possibility that the match is a false positive and the person merely has a face that appears similar to the visual-light image of the user 300.

As an additional example, a microphone that captures audio of the user's voice may be analyzed to determine if a voiceprint of the user is recognized. Analysis of the low-fidelity biometric feature provides a first identity for the person in proximity to the communal computing device 100. This first identity, because it is based on analysis of a biometric feature, may be referred to as a "biometric identity."

At 1006, a personal device 200 (e.g., a smartphone) is detected in proximity to the communal computing device 100. The personal device 200 may be detected by direct communication between the personal device 200 and the communal computing device 100 (e.g., short-range wireless communication). The personal device 200 also has a trust relationship 204 with the cloud-based provider 104. Thus, both the communal computing device 100 and the personal device 200 have respective trust relationships 106, 204 with the same cloud-based provider 104.

Instead of direct detection by the communal computing device 100, the cloud-based provider 104 communicates to the communal computing device 100 that the personal device 200 is nearby based on location information provided by the personal device 200. Location of the personal device 200 may be found based on comparison to a known or fixed location. For example, the location of the device may be determined by global positioning system (GPS) satellites, triangulation from cellular towers, or connection to a Wi-Fi hotspot. The detected location of the device can be compared to the location of the communal computing device 100 determine if the personal device 200 is nearby. For example, if a laptop computer associated with the user 300 is connected to the same Wi-Fi hotspot used by the communal computing device 100, and that may be used to identify the laptop computer as being proximate to the communal computing device 100.

At 1008, a user identity associated with the personal device 200 is determined. The personal device 200 may provide a hardware ID or other identifier to the cloud-based provider 104. The ID obtained from the personal device 200 is compared to user profiles to determine if the same ID is associated with any of the user profiles known to the cloud-based provider 104. If there is a match, then a second identity based on the personal device 200 is determined. The second identity may be referred to as a "device identity" because it is determined based on the identifier of the personal device 200.

At 1010, the first identity and the second identity are compared to see if they match. For example, the biometric identifier may be determined by the cloud-based provider 104 to match with the user identity of a specific user 300. If the hardware ID from the personal device 200 is also associated with the same user identity, then this is categorized as a match. Thus, two different sources of identity, one based on biometrics and other based on a mobile device, both point to the same user identity.

In implementations, there may be multiple people and multiple mobile devices present in proximity to the communal computing device 100. For each user identity for which there is both a biometric identifier and a device identifier, the cloud-based provider 104 may designate a match and report that user identity to the communal computing device 100.

If there is a match between the first identity and the second identity with a user identity at 1010, then process 1000 proceeds along the "yes" path to 1012. If there is not a match, then process 1000 proceeds along the "no" path and returns to 1002 where monitoring of the environment around the communal computing device 100 continues. The person who is present in proximity to the communal computing device 100 but has not been identified may be provided limited or no access to functionality of the communal computing device 100 such as "guest" access which is limited to only basic functions of the communal computing device 100 and may prohibit the user 300 as a guest from making changes or saving any files on the communal computing device 100.

At 1012, if there is a match between the two independent sources of identity, the user 300 is recognized by the communal computing device 100. This recognition may consist of unlocking the communal computing device 100 and/or logging in the user 300 to the communal computing device 100. Once recognized, the user 300 may be provided access to features of the communal computing device 100 and his or her private data. For example, the user 300 may access applications 904 as shown in FIG. 9. Additionally, user preferences associated with the user 300 may be loaded on the communal computing device 100. User preferences can include, for example, volume, brightness, accessibility settings like narration or magnifying glass functionality, and UI language. The user preferences may be received from a user profile that can be obtained from the cloud-based provider 104.

Figure 10A:
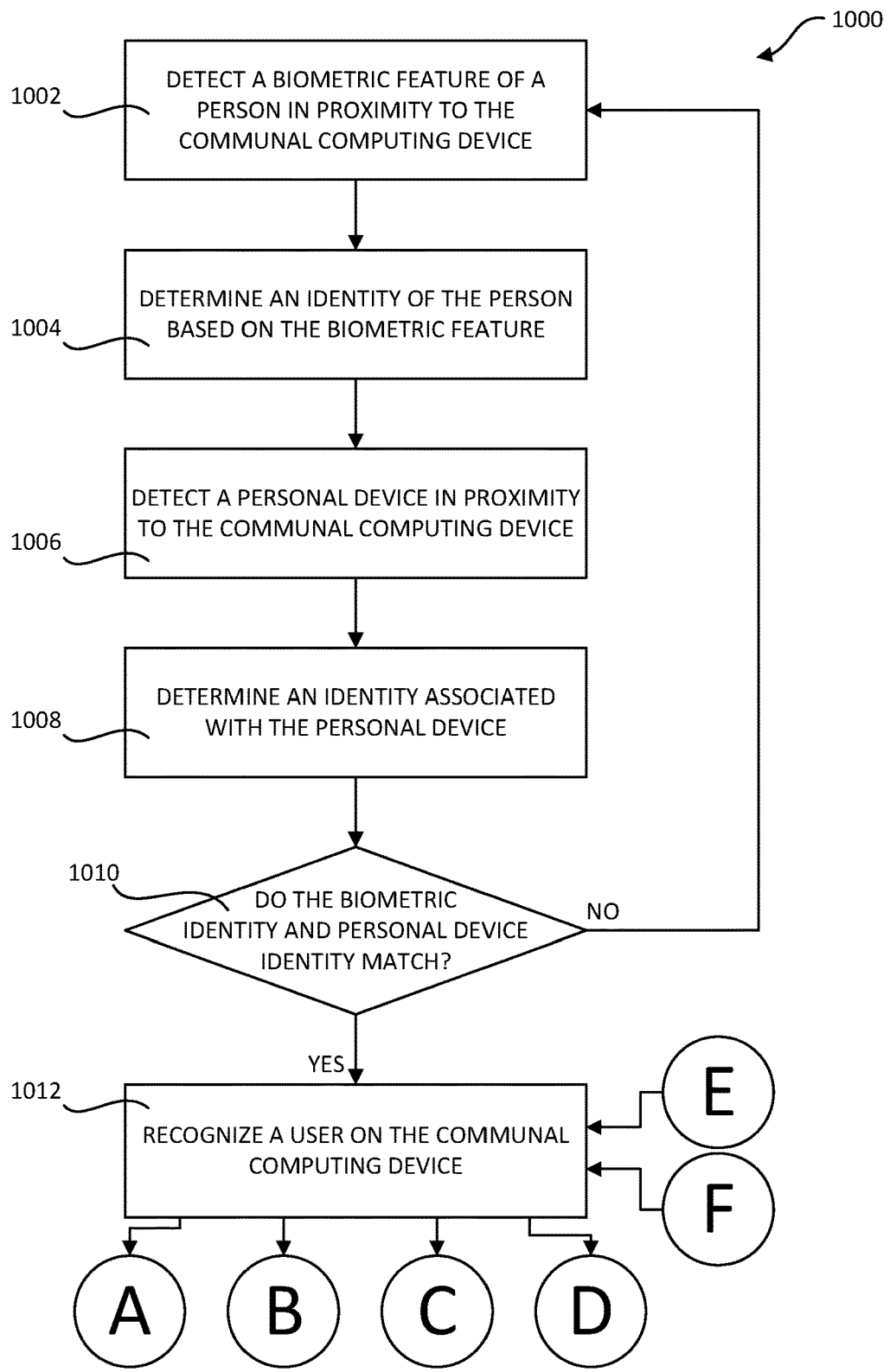
FIGS. 10A-E are illustrative flow diagrams showing a process for identifying a user to the communal computing device.
Figure 10B:
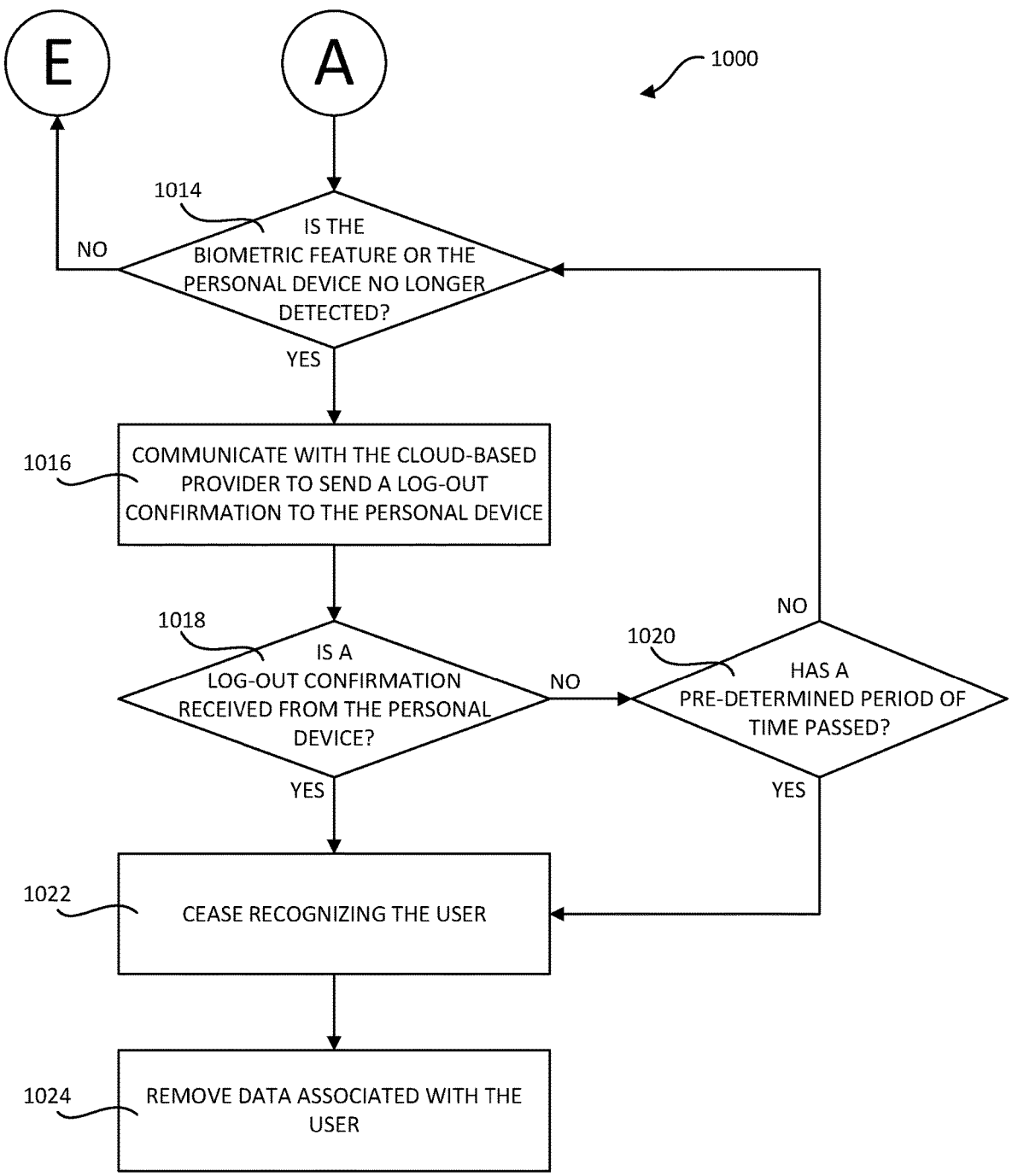

FIG. 10B continues process 1000 and shows operations for logging the user 300 out of the communal computing device 100. At 1014, is determined if either the biometric feature or the personal device is no longer detected. If one or both of those signals ceases to be detected, then process 1000 proceeds along the "yes" path to 1016. If both the biometric feature and the personal device continue to be detected than process 1014 proceeds along the "no" path where the user 300 is continued to be recognized by the communal computing device 100.

At 1016, the communal computing device 100 communicates with the cloud-based provider 104 by sending a logout query 700 which causes the cloud-based provider 104 to send a logout confirmation 702 to the personal device 200.

At 1018, it is determined if a confirmation of log out 704 is received from the personal device 200. If a confirmation of log out 704 is not received by the cloud-based provider 104, then process 1000 proceeds along the "no" path to 1020. If the user 300 interacts with his or her personal device 200 to generate a response affirmatively indicating his or her desire to log out, then process 1000 proceeds along the "yes" path to 1022.

At 1020, it is determined if a threshold period of time has passed. The threshold period of time may be a timeout period after which the user 300 is logged out even if there is no affirmative indication of a desire to be locked out. This period of time may be predetermined by the user 300, by settings enforced by the cloud-based provider 104, or by another entity. The timeout period may be configured as any length of time such as five minutes, 10 minutes, 15 minutes, or longer. If the threshold period of time has not yet elapsed and the confirmation of log out 704 has not yet been received, then process 1000 proceeds along the "no" path and returns to 1014 to continue checking if either or both of the biometric feature and the personal device 200 are still detected. If the threshold period of time has passed, then process 1000 proceeds along the "yes" path to 1022.

At 1022, the communal computing device 100 ceases to recognize the user identity of the user 300. This may be implemented as the communal computing device 100 automatically logging out the user 300. In some implementations, the communal computing device 100 may never fully become locked but remain in a state where it can be used by other users or accessed at a "guest" level. In some implementations, once the user 300 is no longer recognized and if there are no other active users, then the communal computing device 100 may change to a locked state.

At 1024, as part of logging the user 300 out of the communal computing device 100, some or all of the data associated with user identity may be removed from the communal computing device 100. For example, user preferences and customizations may be removed. Access to files folders and accounts associated with user identity may also be removed. Removal may include providing access to features and data as well as actively deleting any data associated with the user account from local memory on the communal computing device 100.

Figure 10C:
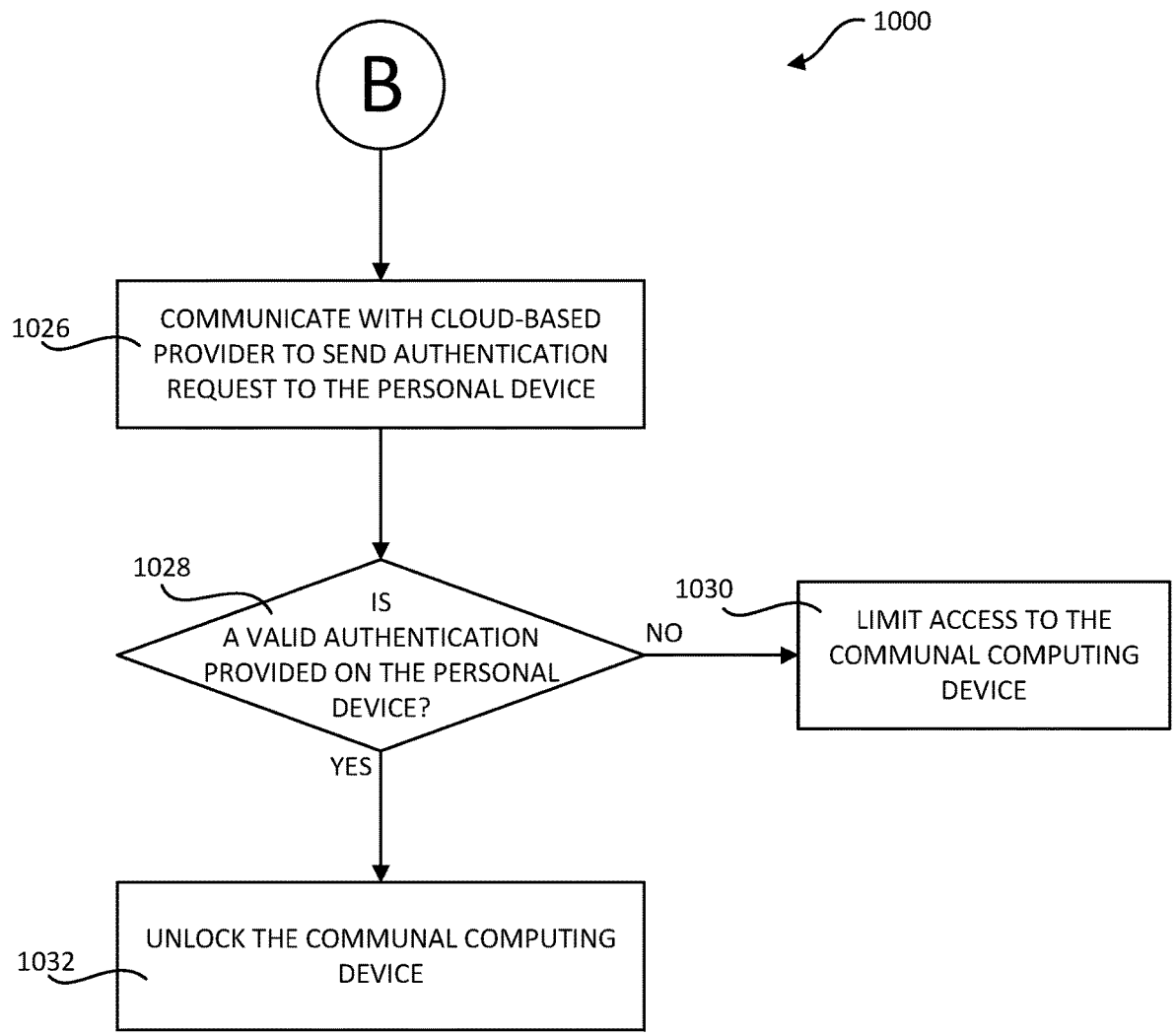

FIG. 10C shows an additional portion of process 1000 and operations for authenticating the user 300 by use of the personal device 200. At 1026, the communal computing device 100 communicates with the cloud-based provider 104 to cause an authentication request to be sent to a personal device 200 associated with the user 300. One implementation of this authentication request is shown in FIG. 6. The cloud-based provider 104 receives a message from the communal computing device 100 requesting authentication of the user 300. The authentication request 600 includes a presumed identity of the user 300. Thus, with this identity, the cloud-based provider 104 is able to identify the appropriate personal device 200. Of course, if the user 300 is misidentified then the cloud-based provider will send an authentication request to the wrong device and the user 300 will not be able to authenticate.

The cloud-based provider 104 sends its own authentication request 602 to the personal device 200. The authentication request 602 sent to the personal device 200 may be a request to enter a second factor for identification such as a password or pin. The authentication request 602 may also be instructions to authenticate using a biometric reader on the personal device 200.

At 1028, is determined if a valid authentication was provided on the personal device 200. The personal device 200 may send the response 604 to the authentication request to the cloud-based provider 104 indicating that the user 300 successfully (or unsuccessfully) responded to the authentication challenge. If the input provided on the personal device 200 was not correct, for example by an incorrect password or failed biometric match, then process 1000 proceeds along the "no" path to 1030. If valid authentication is provided, then process 1000 proceeds along the "yes" path to 1032.

At 1030, the communal computing device 100 may limit access. For example, the communal computing device may provide only guest level functionality even if the user 300 is identified by one or more of a biometric feature or a personal device 200. Alternatively, after one or more failed attempts to authenticate, the communal computing device 100 may limit access by removing access. For example, the communal computing device 100 could lock in response to a failed authentication attempt.

At 1032, the communal computing device 100 unlocks in response to the authentication. Due to the trust relationship 204 between the personal device 200 and the cloud-based provider 104, the cloud-based provider 104 trusts the indication from the personal device 200 that the user 300 has successfully authenticated. Cloud-based provider 104 now considers the user 300 successfully authenticated and communicates the authenticated status of the user 300 to the communal computing device 100. The trust relationship 106 between the communal computing device 100 and the cloud-based provider 104 allows the communal computing device 100 to rely upon the authentication recognized by the cloud-based provider 104 and in turn recognize the user 300 as authenticated on the communal computing device 100.

Once authenticated, the user 300 may be able to install his or her own applications on the communal computing device 100. Additionally, authentication may allow the user 300 to access private data on the communal computing device 100 such as accessing his or her email account, or personal files in a network-accessible storage location.

Figure 10D:
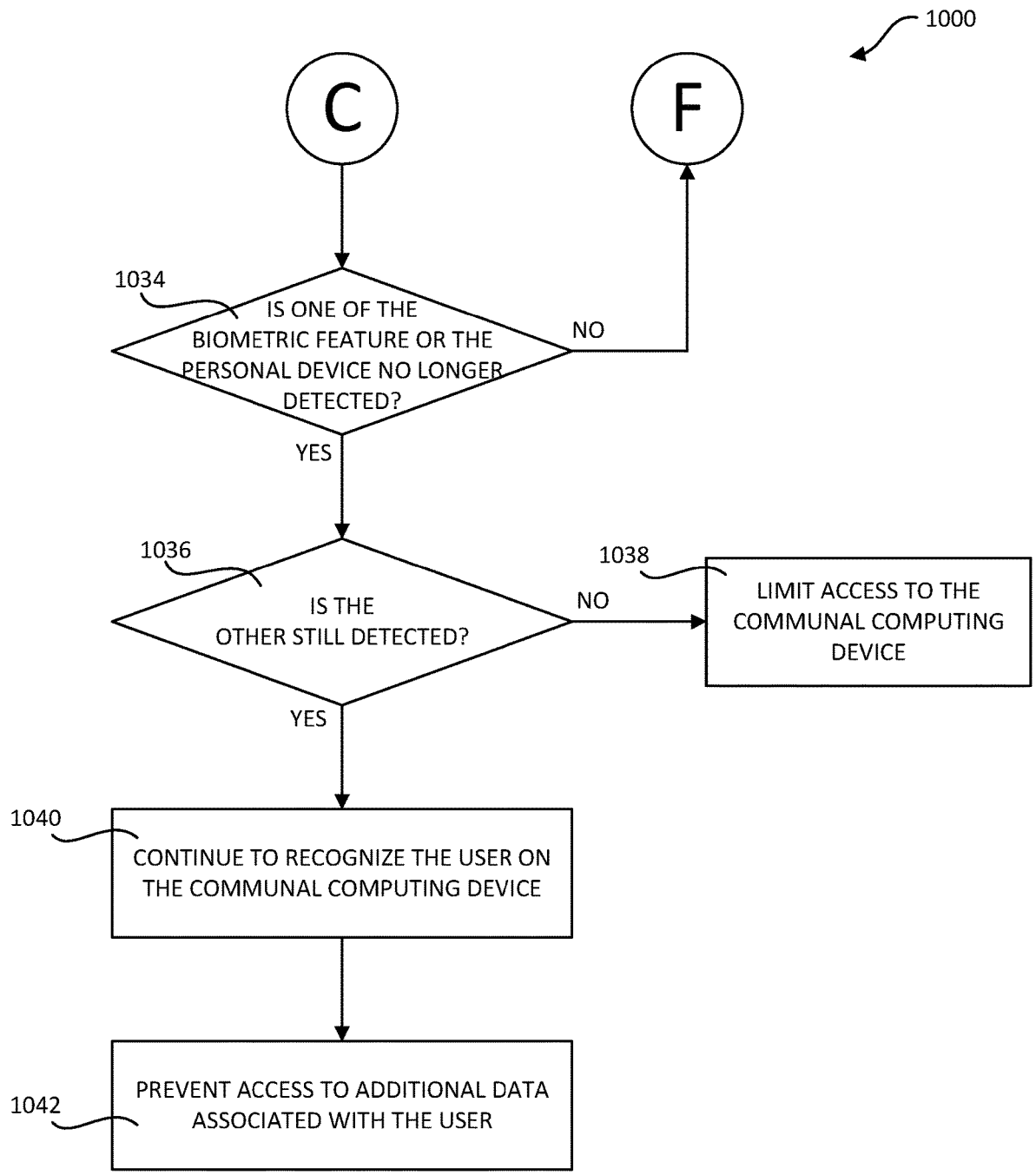

FIG. 10D illustrates a portion of process 1000 concerning operations related to ceasing to recognize the user 300 if the presence of the user 300 is no longer detected in proximity to the communal computing device 100. At 1034, it is determined if one of the biometric features or the personal device is no longer detected in the proximity to the communal computing device 100. Failure to detect on these features could indicate that the user 300 or the personal device 200 has moved away from the communal computing device 100. However, the user 300 could still be present even if his or her face, for example, may no longer be in view of the camera on the communal computing device 100 or his or her personal device 200 may have powered off.

If both the biometric feature and the personal device 200 are still detected, then process 1000 proceeds along the "no" path and returns to 1012 where user 300 continues to be recognized by the communal computing device 100.

At 1036, it is determined if the other one of the signals is still detected such as detecting the presence of the personal device 200 without detecting any biometric identifiers of the user 300 or detecting a biometric feature of the user 300 (e.g., a visual-light image of the user's face, audio including the user's voice, etc.) but failing to detect the personal device 200 in proximity to the communal computing device 100. If the other signal is not detected such that neither the biometric feature nor the personal device is detected in proximity to the communal computing device 100, then process 1000 proceeds along the "no" path to 1038.

At 1038, access to the communal computing device 100 is limited. For example, the communal computing device 100 may provide only guest level functionality. Alternatively, the communal computing device 100 may allow other users to continue using documents and files that are currently open but prevent access to other documents and files associated with the user identity of the user 300.

At 1040, when only one of the biometric feature or the personal device is detected, the communal computing device 100 continues to recognize the user 300. However, this recognition may be limited such as the user 300 being partially logged out. For example, the user 300 may be recognized as logged into the communal computing device 100, but access to functionalities and data associated with the user profile may be limited.

At 1042, users of the communal computing device 100, including but not limited to the user 300, are prevented from accessing additional data associated with user identity of the user 300. For example, a presentation that is open on the communal computing device 100 may continue to be viewed and interacted with, but other files associated with user identity may not be opened if only one of the biometric feature or the personal device is detected.

Figure 10E:
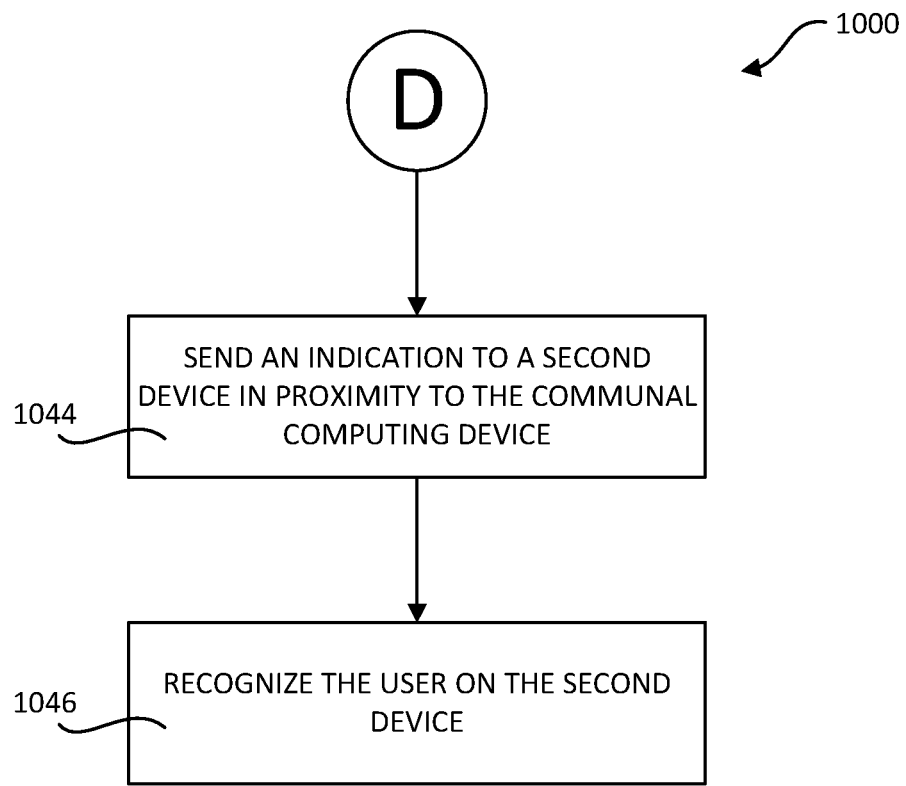

FIG. 10E shows a portion of process 1000 that includes operations for propagating recognition of the user 300 on a separate device that is near the communal computing device 100. At 1044, an indication is sent to a second device in proximity to the communal computing device 100. The indication may be a trust signal such as the unlock signal 508 shown in FIG. 5 that instructs the second device to unlock. The second device may be any other type of electronic or computing device that is near to the communal computing device 100. For example, the second device may be a printer, a television, a desktop computer, tablet computer, a telephonic conferencing system, etc. The second device may be in the same room as the communal computing device 100, on the same local communications network as the community computing device 100, or within range of a wireless communication transmitter that is used by the communal computing device 100.

At 1046, the user 300 is recognized on the second device. The user 300 is recognized as a result of the indication sent at 1044 without the user 300 directly logging in or interacting with the second device. Propagating recognition of the user 300 from the communal computing device 100 to other nearby devices may be performed from multiple devices such that many devices or all other devices in the room recognize the user 300 once the user has been identified by the communal computing device 100. Recognition may grant the user 300 the same privileges and levels of access that the user has on the communal computing device 100.

FIG. 11 is a computer architecture diagram showing an illustrative computer hardware and software architecture for a computing device 1100 that can implement the various technologies presented herein. In particular, the architecture illustrated in FIG. 11 can be utilized to implement a communal computing device 100 such as an interactive digital whiteboard, shared kiosk, smart television, in-car computer, desktop or laptop computer, or another type of communal computing device.

The computing device 1100 illustrated in FIG. 11 includes one or more central processing unit(s) (CPU) 1102, one or more instances of system memory 1104, which may include a random-access memory 1106 (RAM) and a read-only memory (ROM) 1108. A system bus 1110 may function to couple the system memory 1104 to the CPU 1102 and connect both to other components of the computing device 1100. However, the computing device 1100 may also be implemented in an architecture that does not include a system bus 1110. A basic input/output system (BIOS or firmware) containing the basic routines that help to transfer information between elements within the computing device 1100, such as during startup, can be stored in the ROM 1108. The computing device 1100 further includes a mass storage device 1112 for storing a communal computing device operating system 1114, application programs, such as single user aware applications (not shown), multi-user aware applications (not shown), and other types of programs. The mass storage device 1112 can also be configured to store other types of programs and data.

The mass storage device 1112 may be connected to the CPU 1102 through a mass storage controller (not shown) connected to the system bus 1110. The mass storage device 1112 and its associated computer-readable media provide non-volatile storage for the computing device 1100. Although the description of computer-readable media contained herein refers to a mass storage device 1112, such as a hard disk, CD-ROM drive, DVD-ROM drive, or USB storage key, it should be appreciated by those skilled in the art that computer-readable media can be any available computer-readable storage media or communication media that can be accessed by the computing device 1100.

Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer-readable media.

By way of example, and not limitation, computer-readable storage media can include volatile and non-volatile, removable and non-removable media implemented in any method or technology for storage of information such as computer-readable instructions, data structures, program modules or other data. For example, computer storage media includes, but is not limited to, RAM 1106, ROM 1108, EPROM, EEPROM, flash memory or other solid-state memory technology, CD-ROM, digital versatile disks (DVD), HD-DVD, BLU-RAY, or other optical storage, magnetic cassettes, magnetic tape, magnetic disk storage or other magnetic storage devices, or any other medium that can be used to store the desired information and which can be accessed by the computing device 1100. For purposes of the claims, the phrase "computer-readable storage medium," and variations thereof, does not include waves or signals per se or communication media. Thus, computer-readable storage media and communication media are mutually exclusive.

According to various configurations, the computing device 1100 can operate in a networked environment using logical connections to remote computers through a network such as the network 102. The computing device 1100 can connect to the network 102 through a network interface unit 1116 connected to the system bus 1110. It should be appreciated that the network interface unit 1116 can also be utilized to connect to other types of networks and remote computer systems such as the personal device 200 and the cloud-based provider 104. The computing device 1100 can also include a local interface unit 1118 to form communicative connections with local devices such as through a wired or wireless connection. For example, local interface unit 1118 can connect the computing device 1100 via a cable such as an ethernet cable or USB cable to another device such as a biometric reader, a video camera, etc. Wireless connections such as BLUETOOTH, infrared, etc. may also be implemented through the local interface unit 1118 such as, for example, a wireless connection to the personal device 200.

The computing device 1100 may also include an input/output (I/O) controller 1120 for receiving and processing input from a number of other devices, including a keyboard, mouse, touchscreen 1122, a touch pad, a trackball, an electronic stylus a joystick, image processing and gesture recognition devices, or physical sensor(s) such as a video camera, microphone array, or fingerprint reader. Similarly, the I/O controller 1120 can provide output to a display screen, a touchscreen 1122, or other type of output device such as a speaker.

It should be appreciated that the software components described herein, when loaded into the CPU 1102 and executed, can transform the CPU 1102 and the overall computing device 1100 from a general-purpose computing device into a special-purpose computing device customized to facilitate the functionality presented herein. The CPU 1102 can be constructed from any number of transistors or other discrete circuit elements, which can individually or collectively assume any number of states. More specifically, the CPU 1102 can operate as a finite-state machine, in response to executable instructions contained within the software modules disclosed herein. These computer-executable instructions can transform the CPU 1102 by specifying how the CPU 1102 transitions between states, thereby transforming the transistors or other discrete hardware elements constituting the CPU 1102.

Encoding the software modules presented herein can also transform the physical structure of the computer-readable media presented herein. The specific transformation of the physical structure depends on various factors, in different implementations of this description. Examples of such factors include, but are not limited to, the technology used to implement the computer-readable media, whether the computer-readable media is characterized as primary or secondary storage, and the like. For example, if the computer-readable media is implemented as semiconductor-based memory, the software disclosed herein can be encoded on the computer-readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer-readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

The computing device 1100 may also include one or more physical sensor(s) 1124 such as a camera, a video camera, a microphone array, etc. that capture data from the environment proximate to the computing device 1100. A video camera may be used by the computing device 1100 to recognize people in front of the device and for video conferencing. Recognizing people in front of the device may allow for the computing device 1100 in conjunction with the cloud-based provider 104 to identify individual users. The physical sensor(s) 1124 may be integrated into the computing device 1100 or they may be accessories attached to the computing device 1100. Sensor data generated by the physical sensor(s) 1124 may be provided to other components of the computing device 1100 via the I/O controller 1120.

In light of the above, it should be appreciated that the computing device 1100 may implement the technologies and techniques discussed above and shown in FIGS. 1-10 using the communal computing device operative system 1114 and/or other software. For example, the computing device 1100 can establish a trust relationship with the cloud-based provider 104 which may be implemented in part by an encrypted data connection via the network 102. The communal computing device operating system 1114 or other software may function to recognize authentication and identification information provided by the cloud-based provider 104.

With the established trust relationship, the computing device 1100 can determine an identity of a user proximate to it through use of a physical sensor(s) 1124 and/or the local interface unit 1118. For example, one or more physical sensor(s) 1124 such as a visual-light camera or a microphone may detect the face or voice of a person and identify the person as a particular user based on data available to the cloud-based provider 104. The low-fidelity biometric identification signal obtained by the physical sensor(s) 1124 may have an error rate that exceeds the threshold allowable for traditional biometric authentication signals. For example, the error rate may be 1:20,000 or higher.

The local interface unit 1118 may, additionally or alternatively, detect a signal from the personal device 200, or another device, in proximity to the computing device 1100. The signal may be sent via radio waves such as by BLUETOOTH, by light such as an infrared signal, or with a different technology. The signal may contain a unique identifier for the device such as a hardware ID, phone number, etc. Scheduling information available to the computing device 1100 such as a calendar entry that indicates identities of one or more users may identify a user or users who are likely to be proximate to the computing device 1100 at the date and time indicated in the calendar entry. Furthermore, a location of a second device associated with the user 300 (which may be but is not limited to the personal device 200) can be interpreted as an indication that the user 300 is proximate to the computing device 1100. Specifically, if the location for the second device is reported as being at or near a known location of the computing device 1100, then that similarity in location may be a signal that the user 300 is proximate to the computing device 1100.

The user characteristics such as facial image or voice, signals from the personal device 200 proximate to the computing device 1100, a calendar entry, and location of a second device, are types of passive identity signals associated with the user 300. These passive identity signals can be obtained by the computing device 1100 without any affirmative action on the part of the user 300. This provides a friction-free and convenient way for the user 300 to be identified by the computing device 1100 if the user opts in to passive identification. In some implementations, two or more passive identity signals may be required before the user 300 is identified. For example, the computing device 1100 may be configured such that at least one passive identity signal received from a physical sensor(s) 1124 and at least one passive identity signal received from a device via the local interface unit 1118 are required before confirming the identity of a user 300.

When the user 300 is identified, the computing device 1100 may respond by using the I/O controller 1120 to modify a user interface such as the touchscreen 1122. The modification of the UI may present a first content based on the identity of the user 300. This first content may be the same or similar to that illustrated in FIG. 9.

The computing device 1100 can also authenticate the user 300 by use of the communal computing device operating system 1114 or other software. Authentication may be made in response to receipt of an indication from the cloud-based provider 104 that a correct response to an authentication request was received from the personal device 200. Because the computing device 1100 has established a trust relationship with the cloud-based provider 104 and if the personal device 200 also has an established trust relationship with the cloud-based provider 104, then the correct authentication response provided on the personal device 200 may be trusted and relied upon by the computing device 1100.

The computing device 1100 may include in the mass storage device 1112 or elsewhere computer-executable instructions which, when executed by the CPU 1102 or other processor(s) cause the computing device 1100 to implement technologies and processes discussed above. For example, the instructions may cause the computing device 1100 to establish a trust relationship with the centrally-managed identity service 800 that is part of the cloud-based provider 104. The computing device 1100 may also detect the presence of a person in proximity to the communal computing device 100 using one or more sensors such as the physical sensor(s) 1124. The computing device 1100 may then query one or more personal device(s) 200 in its proximity for low-fidelity biometric identifiers 502. For example, every smartphone that is able to communicate over BLUETOOTH with the communal computing device 100 may be asked to provide a low-fidelity biometric identifier. The local interface unit 1118 may be used by the computing device 1100 to transmit the query to the personal device 200.

The low-fidelity biometric identifier 502 can be stored in the local memory of the personal device 200 and may be a voiceprint of the user 300, a visual-light photograph of the face of the user 300, or some other biometric identifier that is associated with the user 300 of the personal device 200. If the personal device 200 responds to the query, then the computing device 1100 will obtain the low-fidelity biometric identifier 502 from the personal device 200. The computing device 1100 may be configured to determine that the personal device 200 has a trust relationship 204 with the cloud-based provider 104. This may be determined by using the network interface unit 1116 to send a query to the cloud-based provider 104 to determine if a hardware ID (or other unique identifier such as a phone number) of the personal device 200 is included in a list of trusted devices. If it is, then the computing device 1100 may be able to trust the biometric identifier provided directly from the personal device 200 as being a true identifier for the user 300. Checking the existence of a trust relationship between the personal device 200 and the cloud-based provider 104 may protect the computing device 1100 from spoofing or impersonation attacks that use untrusted mobile devices to provide fraudulent biometric identification data.

The instructions on the computing device 1100 may compare the low-fidelity biometric identifier 502 obtained from the personal device 200 with data captured by one or more of the physical sensor(s) 1124. For example, if the low-fidelity biometric identifier 502 is a voiceprint, then the computing device 1100 may compare that data with audio captured by the microphone array. Additionally, if the low-fidelity biometric identifier 502 is a visual-light image of a person's face, then the computing device 1100 may compare that data with still photographs or video captured by a camera. Using appropriate analysis techniques such as, for example, fuzzy logic and artificial intelligence the computing device 1100 can determine that the low-fidelity biometric identifier 502 matches the data captured by the physical sensor(s) 1124.

Thus, with a match between data captured from its own physical sensor(s) 1124 and separate data from a trusted device (i.e., the personal device 200), logic included in the instructions on the computing device 1100 may recognize the person detected by the sensor 1124 as being the user 300 that is associated with the low-fidelity biometric identifier 502. This allows the user's low-fidelity biometric data stored on his or her personal device 200 to effectively provide enrollment data to the communal computing device 100 which allows it to recognize the user 300 based on his or her biometrics. The trust relationships between the computing device 1100 and the cloud-based provider 104 combined with the trust relationship between the personal device 200 and the cloud-based provider 104 enable the computing device 1100 to safely rely upon the low-fidelity biometric data provided by the personal device 200 even if the computing device 1100 and the personal device 200 have not been formally paired or associated with each other on a device-to-device level.

In some implementations, instructions on the computing device 1100 may cause the cloud-based provider 104 to request authentication of the user 300 the personal device 200. The authentication request may be similar to that illustrated in FIG. 6. After the user 300 has authenticated on his or her personal device 200, the centrally-managed identity service 800 can send an authentication signal to the computing device 1100. The computing device 1100 will then receive the indication from the centrally-managed identity service 800 that authentication of the user was performed on the personal device 200. Upon receiving an indication from the cloud-based provider 104 that authentication on the personal device 200 was successful, instructions may cause the computing device 1100 to unlock for use by the user 300.

In an implementation, the trust relationship between the computing device 1100 and the cloud-based provider 104 may be propagated to all other devices that are proximate to the computing device 1100 and that also share the trust relationship with the cloud-based provider 104. Thus, unlocking the computing device 1100 may also unlock one or more other devices at the same location. This may be implemented by using the local interface unit 1118 to send a signal to a second device proximate to the computing device 1100 that causes the second device to recognize the user 300.

Additionally, the executable instructions may cause the computing device 1100 to remove access when the user 300 is no longer present in the proximity of the computing device 1100. For example, instructions may cause the computing device 1100 to determine that the presence of the user 300 is no longer detected in proximity to the computing device 1100. For example, if the video camera on the computing device 1100 does not detect any people and there are no wireless signals from mobile devices recognized by the computing device 1100, the computing device 1100 may determine that the user 300 is no longer present.

The computing device 1100 may respond by removing access to at least one feature associated with the user 300. For example, the computing device 1100 may remove all access by going into a sleep or locked state. Doing so can save energy and also improve security by preventing access to functionality and data associated with the user 300 if someone else uses the computing device 1100 while the user 300 is not present. Alternatively, some functionality or data access may be restricted without locking the computing device 1100 so other users working on the computing device 1100 may continue to do so. This may be implemented as a partial log out or a partial de-authentication of the user 300.

It is also contemplated that the computing device 1100 might not include all of the components shown in FIG. 11, can include other components that are not explicitly shown in FIG. 11, or can utilize an architecture different than that shown in FIG. 11.

ILLUSTRATIVE EMBODIMENTS

The following clauses described multiple possible embodiments for implementing the features described in this disclosure. The various embodiments described herein are not limiting nor is every feature from any given embodiment required to be present in another embodiment. Any two or more of the embodiments may be combined together unless the context clearly indicates otherwise. As used herein in this document "or" means and/or. For example, "A or B" means A without B, B without A, or A and B. As used herein, "comprising" means including all listed features and potentially including addition of other features that are not listed. "Consisting essentially of" means including the listed features and those additional features that do not materially affect the basic and novel characteristics of the listed features. "Consisting of" means only the listed features to the exclusion of any feature not listed.

Clause 1. A computer-implemented method for identifying a user to a communal computing device, the method comprising: detecting a biometric feature of a person in proximity to the communal computing device, the communal computing device having a trust relationship with a cloud-based provider; determining a first identity associated with the biometric feature; detecting a personal device in proximity to the communal computing device, the personal device also having the trust relationship with the cloud-based provider; determining a second identity associated with the personal device; matching the first identity and the second identity to a user identity of the user; and recognizing the user on the communal computing device.

Clause 2. The computer-implemented method of clause 1, further comprising: ceasing to detect the biometric feature or ceasing to detect the personal device; communicating with the cloud-based provider to cause a log out confirmation to be sent to the personal device; receiving an indication that confirms log out; ceasing to recognize the user identity on the communal computing device; and removing at least a portion of data associated with the user identity from the communal computing device.

Clause 3. The computer-implemented method of clause 1 or 2, further comprising: communicating with the cloud-based provider to cause an authentication request to be sent to the personal device; receiving an indication that a valid authentication was provided on the personal device; and unlocking the communal computing device.

Clause 4. The computer-implemented method of clause 1-3, further comprising: ceasing to detect one of the biometric feature or the personal device while continuing to detect the other; continuing to recognize the user identity on the communal computing device; and preventing access to additional data associated with the user identity.

Clause 5. The computer-implemented method of clause 1-4, further comprising: sending an indication to a second device in proximity to the communal computing device identifying the user; and recognizing the user on the second device.

Clause 6. The computer-implemented method of clause 1-5, wherein the trust relationship shares user identity and user authentication between computing devices included in the trust relationship.

Clause 7. The computer-implemented method of clause 1-6, wherein the communal computing device comprises an interactive digital whiteboard, the personal device comprises a smartphone, and the cloud-based provider comprises a cloud-based trust entity that maintains the user identity and regulates access to the user identity.

Clause 8. At least one computer-readable storage medium having computer-executable instructions stored thereon which, when executed by one or more processors, cause a communal computing device to perform the method of any of clauses 1-7.

Clause 9. A communal computing device comprising: one or more processors; at least one computer-readable medium having computer-executable instructions stored thereon which, when executed by the one or more processors, cause the communal computing device to perform the method of any of clauses 1-7.

Clause 10. A communal computing device comprising: one or more processors; at least one computer-readable medium having computer-executable instructions stored thereon which, when executed by the one or more processors, cause the communal computing device to: establish a trust relationship with a cloud-based provider; detect a device identifier of a mobile device proximate to the communal computing device; provide the device identifier to the cloud-based provider; receive low-fidelity biometric data of a user associated with the mobile device from the cloud-based provider; capture sensor data from a sensor of the environment proximate to the communal computing device; determine that at least a portion of the sensor data matches the low-fidelity biometric data of the user; and recognize the user.

Clause 11. The device of clause 10, wherein the low-fidelity biometric data comprises a visual-light photograph of a face of the user, the sensor comprises a video camera, and the sensor data comprises one or more visual-light images.

Clause 12. The device of clause 10 or 11, wherein the trust relationship provides verification of an identity of the user and data associated with a user profile of the user from a centrally-managed identity service of the cloud-based provider.

Clause 13. The device of any of clauses 10-12, wherein the computer-executable instructions further cause the communal computing device to: send a command to the cloud-based provider that causes the cloud-based provider to send an authentication request to a personal device associated with the user, the personal device also having the trust relationship with the cloud-based provider; receive a response from the cloud-based provider indicating that authentication was completed successfully on the personal device; and unlock the communal computing device for use by the user.

Clause 14. The device of any of clauses 10-13, wherein the computer-executable instructions further cause the communal computing device to, responsive to recognition of the user, modify a user interface to include an element representative of the user.

Clause 15. The device of clauses 10-14, wherein the computer-executable instructions further cause the communal computing device to: determine that the device identifier of the mobile device is no longer detected; send a command to the cloud-based provider that causes the cloud-based provider to send a log out confirmation to a personal device associated with the user; receive an indication from the cloud-based provider that confirms log out; and cease recognition of the user.

Clause 16. The device of any of clauses 10-15, wherein the computer-executable instructions further cause the communal computing device to: determine that the sensor data which matches the low-fidelity biometric data of the user has not been detected for at least a threshold period of time; and cease recognition of the user.

Clause 17. The device of any of clauses 10-16, wherein the computer-executable instructions further cause the communal computing device to: detect a second device identifier of a second mobile device proximate to the communal computing device; provide the second device identifier to the cloud-based provider; receive second low-fidelity biometric data of a second user associated with the second mobile device from the cloud-based provider; capture additional sensor data from the sensor of the environment proximate to the communal computing device; determine that at least a portion of the additional sensor data matches the second low-fidelity biometric data of the second user; and recognize the second user as a simultaneous user.

Clause 18. A computing device comprising: means for processing; means for storing computer-executable instructions; means for establishing a trust relationship with a cloud-based provider; means for detecting a device identifier of a mobile device proximate to the communal computing device; means for providing the device identifier to the cloud-based provider; means for receiving low-fidelity biometric data of a user associated with the mobile device from the cloud-based provider; means for capturing sensor data from a sensor of the environment proximate to the communal computing device; means for determining that at least a portion of the sensor data matches the low-fidelity biometric data of the user; and means recognizing the user.

Clause 19. At least one computer-readable storage medium having computer-executable instructions stored thereon which, when executed by one or more processors, cause a communal computing device to: establish a trust relationship with a cloud-based provider; detect a presence of a person in proximity to the communal computing device using one or more sensors; query a personal device in proximity to the communal computing device for a low-fidelity biometric identifier associated with a user of the personal device; obtain the low-fidelity biometric identifier from the personal device; determine that the personal device also has the trust relationship with the cloud-based provider; determine that the low-fidelity biometric identifier matches data captured by the one or more sensors; receive identification of the user from the cloud-based provider; and recognize the person as the user.

Clause 20. The at least one computer-readable storage medium of clause 19, having further computer-executable instructions stored thereon which cause the communal computing device to: cause the cloud-based provider to request authentication of the user on the personal device; receive an indication from the cloud-based provider that authentication on the personal device was successful; and unlock the communal computing device for the user.

Clause 21. The at least one computer-readable storage medium of clause 19 or 20, wherein the trust relationship unlocks all devices sharing the trust relationship for use by the user.

Clause 22. The at least one computer-readable storage medium of any of clauses 19-21, having further computer-executable instructions stored thereon which cause the communal computing device to: determine that the presence of the person is no longer detected in proximity to the communal computing device; and remove access on the communal computing device to at least one feature associated with the user.

Clause 23. The at least one computer-readable storage medium of any of clauses 19-22, having further computer-executable instructions stored thereon which cause the communal computing device to: send a signal to a second device proximate to the communal computing device that causes the second device to recognize the user.

Clause 24. A communal computing device comprising: one or more processors and the at least one computer-readable storage medium of any of clauses 19-23.

CONCLUSION

For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

Although the subject matter has been described in language specific to structural features and/or methodological acts, it is to be understood that the subject matter defined in the appended claims is not necessarily limited to the specific features or acts described above. Rather, the specific features and acts are disclosed as example forms of implementing the claims.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

Certain embodiments are described herein, including the best mode known to the inventors for carrying out the invention. Of course, variations on these described embodiments will become apparent to those of ordinary skill in the art upon reading the foregoing description. Skilled artisans will know how to employ such variations as appropriate, and the embodiments disclosed herein may be practiced otherwise than specifically described. Accordingly, all modifications and equivalents of the subject matter recited in the claims appended hereto are included within the scope of this disclosure. Moreover, any combination of the above-described elements in all possible variations thereof is encompassed by the invention unless otherwise indicated herein or otherwise clearly contradicted by context.

All patents, patent applications, and other documents referenced in this disclosure are fully incorporated by reference for all that they disclose.

What is claimed is:

1. A communal computing device comprising:
   one or more processors;
   at least one computer-readable medium having computer-executable instructions stored thereon which, when executed by the one or more processors, cause the communal computing device to:
   establish a trust relationship with a cloud-based provider;
   detect a device identifier of a mobile device proximate to the communal computing device;
   provide the device identifier to the cloud-based provider;
   receive low-fidelity biometric data of a user associated with the mobile device from the cloud-based provider;
   capture sensor data from a sensor of an environment proximate to the communal computing device;
   determine that at least a portion of the sensor data matches the low-fidelity biometric data of the user; and
   recognize the user.

2. The device of claim 1, wherein the low-fidelity biometric data comprises a visual-light photograph of a face of the user, the sensor comprises a video camera, and the sensor data comprises one or more visual-light images.

3. The device of claim 1, wherein the trust relationship provides verification of an identity of the user and data associated with a user profile of the user from a centrally-managed identity service of the cloud-based provider.

4. The device of claim 1, wherein the computer-executable instructions further cause the communal computing device to:
   send a command to the cloud-based provider that causes the cloud-based provider to send an authentication request to a personal device associated with the user, the personal device also having the trust relationship with the cloud-based provider;
   receive a response from the cloud-based provider indicating that authentication was completed successfully on the personal device; and
   unlock the communal computing device for use by the user.

5. The device of claim 1, wherein the computer-executable instructions further cause the communal computing device to, responsive to recognition of the user, modify a user interface to include an element representative of the user.

6. The device of claim 1, wherein the computer-executable instructions further cause the communal computing device to:
   determine that the device identifier of the mobile device is no longer detected;
   send a command to the cloud-based provider that causes the cloud-based provider to send a log out confirmation to a personal device associated with the user;
   receive an indication from the cloud-based provider that confirms log out; and
   cease recognition of the user.

7. The device of claim 1, wherein the computer-executable instructions further cause the communal computing device to:
   determine that the sensor data which matches the low-fidelity biometric data of the user has not been detected for at least a threshold period of time; and
   cease recognition of the user.

8. The device of claim 1, wherein the computer-executable instructions further cause the communal computing device to:
   detect a second device identifier of a second mobile device proximate to the communal computing device;
   provide the second device identifier to the cloud-based provider;
   receive second low-fidelity biometric data of a second user associated with the second mobile device from the cloud-based provider;
   capture additional sensor data from the sensor of an environment proximate to the communal computing device;
   determine that at least a portion of the additional sensor data matches the second low-fidelity biometric data of the second user; and
   recognize the second user as a simultaneous user.

9. A computer-implemented method implemented by a communal computing device, the method comprising:
   establish a trust relationship with a cloud-based provider;
   detect a device identifier of a mobile device proximate to the communal computing device;
   provide the device identifier to the cloud-based provider;

receive low-fidelity biometric data of a user associated with the mobile device from the cloud-based provider;

capture sensor data from a sensor of an environment proximate to the communal computing device;

determine that at least a portion of the sensor data matches the low-fidelity biometric data of the user; and recognize the user.

10. The method of claim 9, wherein the low-fidelity biometric data comprises a visual-light photograph of a face of the user, the sensor comprises a video camera, and the sensor data comprises one or more visual-light images.

11. The method of claim 9, wherein the trust relationship provides verification of an identity of the user and data associated with a user profile of the user from a centrally-managed identity service of the cloud-based provider.

12. The method of claim 9, further comprising:

sending a command to the cloud-based provider that causes the cloud-based provider to send an authentication request to a personal device associated with the user, the personal device also having the trust relationship with the cloud-based provider;

receiving a response from the cloud-based provider indicating that authentication was completed successfully on the personal device; and unlocking the communal computing device for use by the user.

13. The method of claim 9, further comprising, responsive to recognition of the user, modifying a user interface to include an element representative of the user.

14. The method of claim 9, further comprising:

determining that the device identifier of the mobile device is no longer detected;

sending a command to the cloud-based provider that causes the cloud-based provider to send a log out confirmation to a personal device associated with the user;

receiving an indication from the cloud-based provider that confirms log out; and cease recognition of the user.

15. The method of claim 9, further comprising:

determining that the sensor data which matches the low-fidelity biometric data of the user has not been detected for at least a threshold period of time; and ceasing recognition of the user.

* * * * *